US012754277B2

(12) United States Patent
Hirzallah et al.

(10) Patent No.: US 12,754,277 B2
(45) Date of Patent: Oct. 6, 2026

(54) TECHNIQUES FOR INDICATING CHANGES IN MAPPING BETWEEN ANCHOR LOCATION/BEAMS AND POSITIONING REFERENCE RESOURCES

(71) Applicant: QUALCOMM Incorporated, San Diego, CA (US)

(72) Inventors: Mohammed Ali Mohammed Hirzallah, San Diego, CA (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 18/339,688

(22) Filed: Jun. 22, 2023

(65) Prior Publication Data

US 2024/0426966 A1 Dec. 26, 2024

(51) Int. Cl.

| | |
|---|---|
| ***G01S 5/02*** | (2010.01) |
| ***G01S 5/00*** | (2006.01) |
| ***H04W 24/02*** | (2009.01) |
| ***H04W 64/00*** | (2009.01) |

(52) U.S. Cl.

CPC .......... *G01S 5/0278* (2013.01); *G01S 5/0063* (2013.01); *H04W 24/02* (2013.01); *H04W 64/00* (2013.01)

(58) Field of Classification Search

None

See application file for complete search history.

(56) References Cited

U.S. PATENT DOCUMENTS

| | | | | |
|---|---|---|---|---|
| 2024/0340136 | A1* | 10/2024 | Hirzallah et al. | H04W 64/00 |
| 2024/0388472 | A1* | 11/2024 | Hirzallah et al. | H04W 64/00 |
| 2025/0056488 | A1* | 2/2025 | Alawieh | G01S 5/0278 |
| 2025/0089001 | A1* | 3/2025 | Barbu et al. | H04W 64/00 |
| 2025/0142516 | A1* | 5/2025 | Hasegawa et al. | H04W 64/00 |
| 2025/0212156 | A1* | 6/2025 | Xiong et al. | G01S 5/011 |
| 2025/0212160 | A1* | 6/2025 | Chen et al. | G01S 5/0205 |
| 2025/0227649 | A1* | 7/2025 | Manolakos | H04W 64/00 |
| 2026/0019982 | A1* | 1/2026 | Hasegawa | G01S 5/0236 |

FOREIGN PATENT DOCUMENTS

| | | | | |
|---|---|---|---|---|
| WO | 2023006222 A1 | | 2/2023 | |
| WO | WO-2023/154710 A1 | * | 8/2023 | H04W 64/00 |
| WO | WO-2024/020086 A1 | * | 1/2024 | G01S 5/0236 |

OTHER PUBLICATIONS

International Search Report and Written Opinion—PCT/US2024/027736—ISA/EPO—Aug. 26, 2024.

* cited by examiner

*Primary Examiner* — Rafael Pérez-Gutiérrez

(74) *Attorney, Agent, or Firm* — Thien T. Nguyen

(57) ABSTRACT

In one aspect, a UE receives, from a network entity, at least one of: (1) a first indication of a first mapping and a first list of indices for first location information, where the first location information is associated with a first set of network nodes and a first set of PRS resources and where the first mapping associates each index in the first list of indices with at least one PRS resource in the first set of PRS resources, or (2) a second indication of a previous implementation of the first mapping. The UE selects or configures at least one AI/ML positioning model based on at least one of the first indication or the second indication.

30 Claims, 22 Drawing Sheets

1100A

```
TRP-LocationInfoElement ::= SEQUENCE {
   dl-PRS-ID                INTEGER (0..255),
   nr-PhysCellID            NR-PhysCellID          OPTIONAL,  -- Need ON
   nr-CellGlobalID          NCGI                   OPTIONAL,  -- Need ON
   nr-ARFCN                 ARFCN-ValueNR          OPTIONAL,  -- Need ON
   associated-DL-PRS-ID INTEGER (0..255)           OPTIONAL,  -- Need OP
   trp-Location          RelativeLocation          OPTIONAL,  -- Need OP
   trp-DL-PRS-ResourceSets    SEQUENCE (SIZE(1..nrMaxSetsPerTrpPerFreqLayer)) OF
                            DL-PRS-ResourceSets-TRP-Element OPTIONAL,   -- Need OP
   ...
}
```

1102

FIG. 11A

1100B

```
-- ASN1START

NR-UEB-TRP-LocationData ::= SEQUENCE {
   nr-trp-LocationInfo          NR-TRP-LocationInfo,
   nr-dl-prs-BeamInfo           NR-DL-PRS-BeamInfo      OPTIONAL,      -- Need ON
   ...
}

-- ASN1STOP
```

1104

FIG. 11B

| TRP/beam | Indexing |
|---|---|
| TRP1/beam1 | A1 |
| TRP1/beam2 | A2 |
| TRP1/beam3 | A3 |
| TRP2/beam1 | B1 |
| TRP2/beam2 | B2 |
| TRP2/beam3 | B3 |
| TRP3/beam1 | C1 |
| TRP3/beam2 | C2 |
| TRP3/beam3 | C3 |
| TRP3/beam4 | C4 |
| TRP3/beam5 | C5 |
| TRP3/beam6 | C6 |
| TRP4/beam1 | D1 |
| TRP4/beam2 | D2 |
| TRP4/beam3 | D3 |
| TRP4/beam4 | D4 |
| TRP4/beam5 | D5 |
| TRP4/beam6 | D6 |

1500A

| Indexing | PRS Resource Set ID | PRS Resource ID |
|---|---|---|
| A1 | 3 | 2 |
| A2 | 3 | 3 |
| A3 | 3 | 1 |
| B1 | 1 | 1 |
| B2 | 1 | 2 |
| B3 | 1 | 3 |
| C1 | 4 | 1 |
| C2 | 4 | 2 |
| C3 | 4 | 3 |
| C4 | 5 | 1 |
| C5 | 5 | 2 |
| C6 | 5 | 3 |
| D1 | 2 | 2 |
| D2 | 2 | 3 |
| D3 | 2 | 1 |
| D4 | 6 | 2 |
| D5 | 6 | 1 |
| D6 | 6 | 3 |

FIG. 15A

1500B

1502

1504

1506

| Indexing | PRS Resource Set ID | PRS Resource ID |
|---|---|---|
| A1 | 2 | 2 |
| A2 | 2 | 3 |
| A3 | 2 | 1 |
| B1 | 1 | 1 |
| B2 | 1 | 2 |
| B3 | 1 | 3 |
| C1 | 4 | 2 |
| C2 | 4 | 3 |
| C3 | 4 | 1 |
| C4 | 5 | 1 |
| C5 | 5 | 2 |
| C6 | 5 | 0 |
| D1 | 1 | 2 |
| D2 | 1 | 3 |
| D3 | 1 | 1 |
| D4 | 6 | 2 |
| D5 | 6 | 1 |
| D6 | 6 | 3 |

1502

FIG. 15B

TECHNIQUES FOR INDICATING CHANGES IN MAPPING BETWEEN ANCHOR LOCATION/BEAMS AND POSITIONING REFERENCE RESOURCES

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a network entity, at least one of: (1) a first indication of a first mapping and a first list of indices for first location information, where the first location information is associated with a first set of network nodes and a first set of positioning reference signal (PRS) resources and where the first mapping associates each index in the first list of indices with at least one PRS resource in the first set of PRS resources, or (2) a second indication of a previous implementation of the first mapping. The apparatus selects or configures at least one artificial intelligence (AI) or machine learning (ML)(AI/ML) positioning model based on at least one of the first indication or the second indication.

In an aspect of the disclosure, a method, a computer-readable medium, and an apparatus are provided. The apparatus configures at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping. The apparatus transmits, to a user equipment (UE), at least one of (1) a first indication of the first mapping and the first list of indices for the first location information, or (2) a second indication of the previous implementation of the first mapping.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11A is a diagram illustrating an example information element (IE) NR-TRP-LocationInfo that may be used by a location server to provide the coordinates of the antenna reference points for a set of transmission reception points (TRPs) to a UE in accordance with various aspects of the present disclosure.

FIG. 11B is a diagram illustrating an example IE NR-UEB-TRP-LocationData that may be used in an assistanceDataElement if the posSibType in IE PosSIB-Type indicates 'posSibType6-2' in accordance with various aspects of the present disclosure.

FIG. 15A is a diagram illustrating an example mapping (e.g., initially or at a first point in time) of indexing and PRS resources in accordance with various aspects of the present disclosure.

FIG. 15B is a diagram illustrating an example updated mapping (e.g., at a second point in time) of the indexing and PRS resources in accordance with various aspects of the present disclosure.

DETAILED DESCRIPTION

Figure 1:
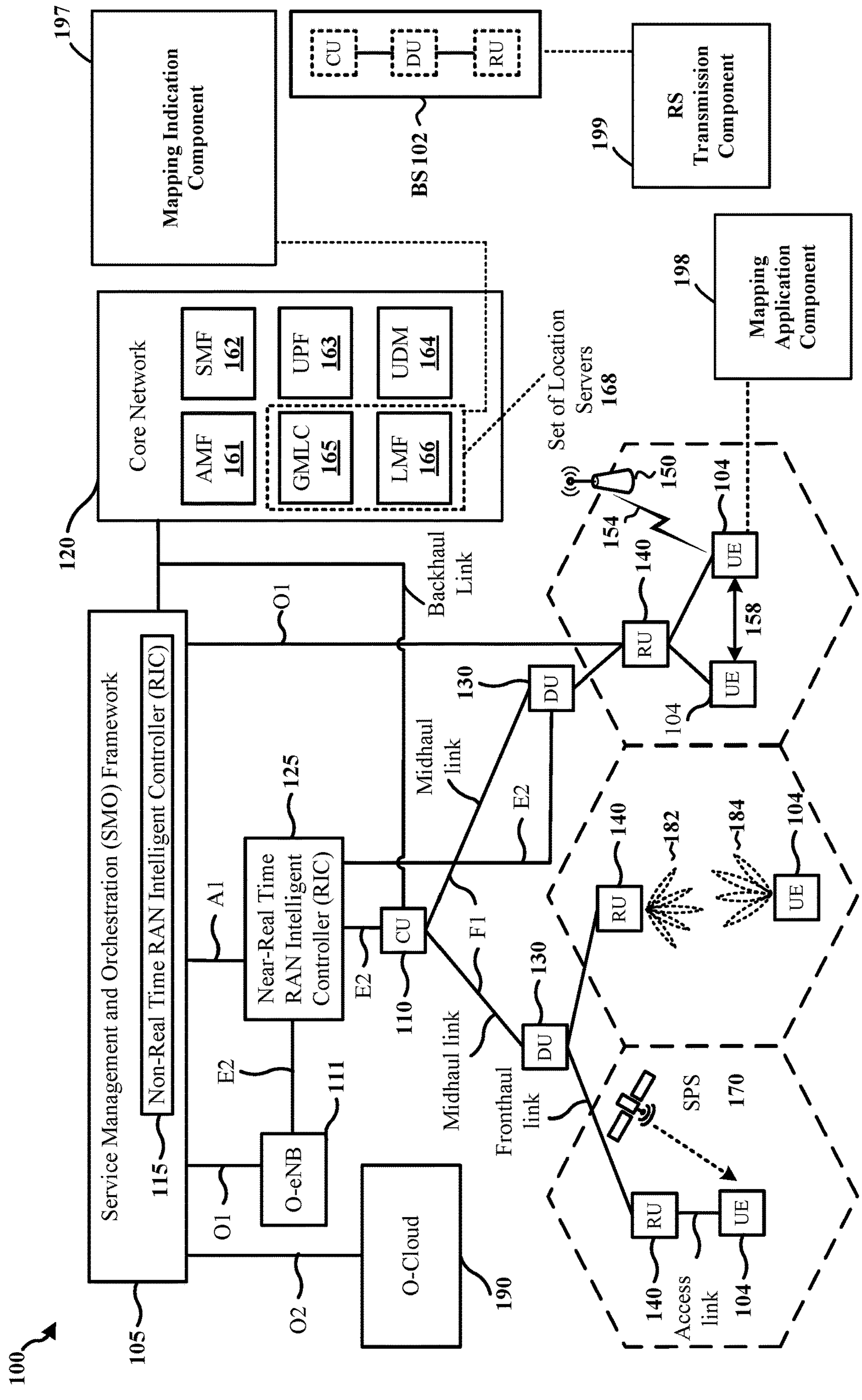
FIG. 1 is a diagram illustrating an example of a wireless communications system and an access network.

Aspects presented herein may improve and maintain the accuracy and performance of artificial intelligence (AI)/machine learning (ML) (AI/ML) positioning by enabling a user equipment (UE) to be aware of changes in mapping between positioning reference signal (PRS) resource(s) and transmission reception point (TRP) location(s)/beam angle(s) without specifying mobile network operators to disclose the locations and beam angle information of their TRPs, thereby enabling the mobile network operators to maintain the privacy of their TRPs. For example, in one aspect of the present disclosure, a network (NW) may indicate, to or for a UE, a mapping (which may also be referred to as a "virtual map" or a "virtual mapping") between PRS resources and TRP locations/beam information that does not disclose the actual/exact TRP locations/beam information, and/or does not specify disclosure of cells physical and global identifications/identifiers (IDs), etc. This may enable a UE to decide how to map PRS measurements to its AI/ML model and/or update and switch the AI/ML model (as applicable).

In one example, a network may be configured to maintain a "unique" indexing for cells/sites/TRPs and their beams, and the network may indicate how PRS resources (e.g., positioning frequency layer (PFL) ID(s), Set ID(s), PRS ID(s)) map to the cells/sites/TRPs and their beams based on this indexing. Thus, the network may be configured to just provide, to a UE, the mapping between its established indexing of TRPs/beams and PRS resources (e.g., PFL ID(s), Set ID(s), PRS ID(s)). When a network decides to change/modify the mapping of PRS resources to TRP locations/beams, the network may send, to or for a UE, an updated map/mapping on how PRS PFLs/Set IDs/PRS IDs map to the cells/sites/TRPs and their beams. In some scenarios, the network may also just indicate a flag that informs the UE that the mapping of PRS resources to TRP locations/beams has been changed. Then, the network may wait for the UE to request a detailed indication of the updated map. In other words, the network may be configured to provide the updated map just upon the request of the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF)

access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, to network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML)(AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a mapping application component 198 that may be configured to receive, from a network entity, at least one of: (1) a first indication of a first mapping and a first list of indices for first location information, where the first location information is associated with a first set of network nodes and a first set of PRS resources and where the first mapping associates each index in the first list of indices with at least one PRS resource in the first set of PRS resources, or (2) a second indication of a previous implementation of the first mapping; and select or configure at least one AI/ML positioning model based on at least one of the first indication or the second indication. In certain aspects, the base station 102 may include a reference signal (RS) transmission component 199 that may be configured to transmit a set of PRSs for the UE 104 to measure.

In certain aspects, the one or more location servers 168 may include a mapping indication component 197 that may be configured to configure at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping; and transmit, to a UE, at least one of (1) a first indication of the first mapping and the first list of indices for the first location information, or (2) a second indication of the previous implementation of the first mapping.

Figure 2B:
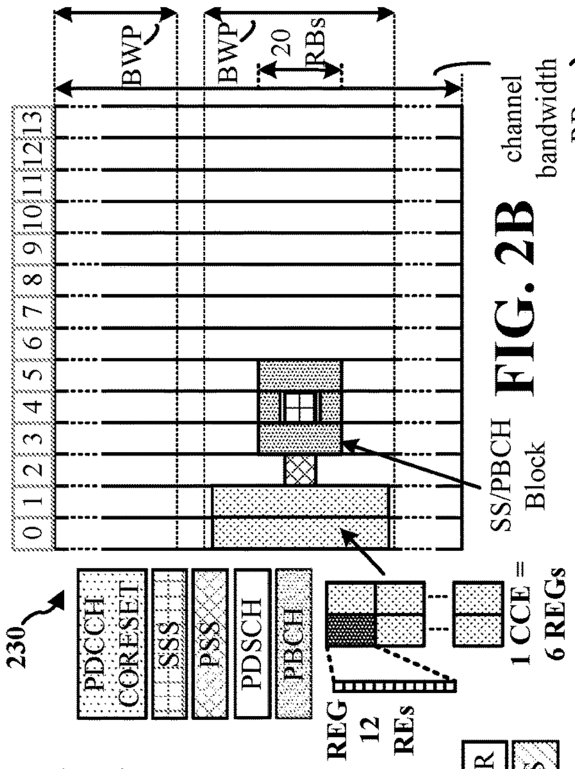
FIG. 2B is a diagram illustrating an example of downlink (DL) channels within a subframe, in accordance with various aspects of the present disclosure.
Figure 2D:
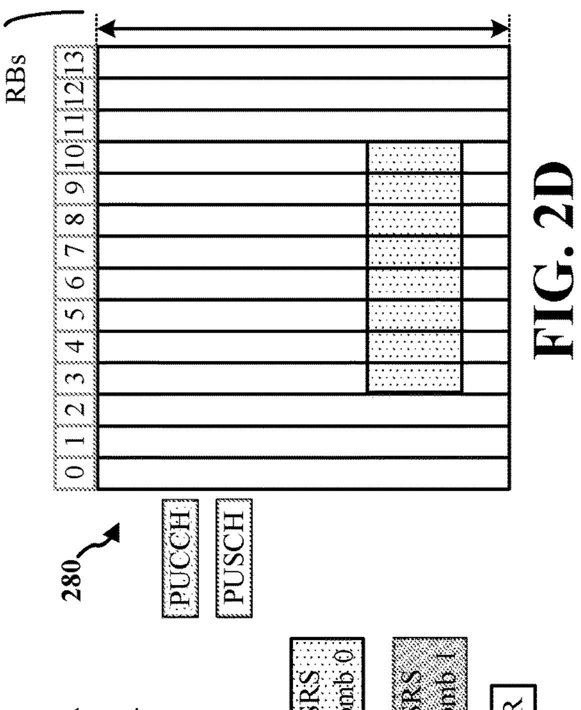
FIG. 2D is a diagram illustrating an example of uplink (UL) channels within a subframe, in accordance with various aspects of the present disclosure.
Figure 2A:
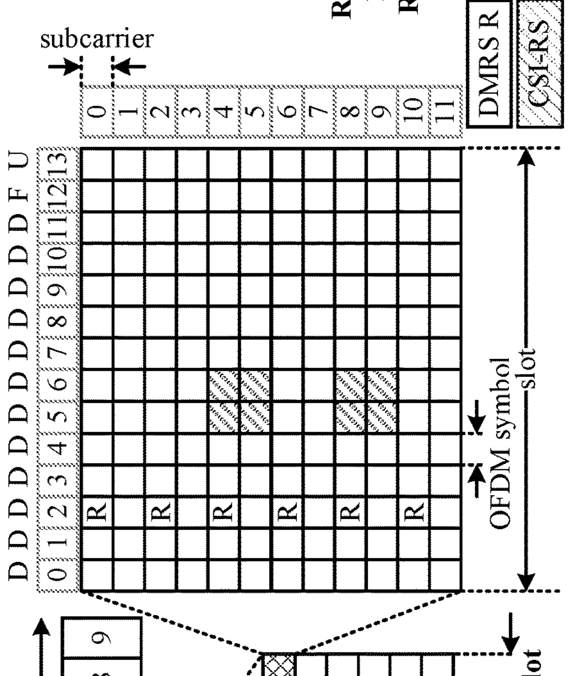
FIG. 2A is a diagram illustrating an example of a first frame, in accordance with various aspects of the present disclosure.
Figure 2C:
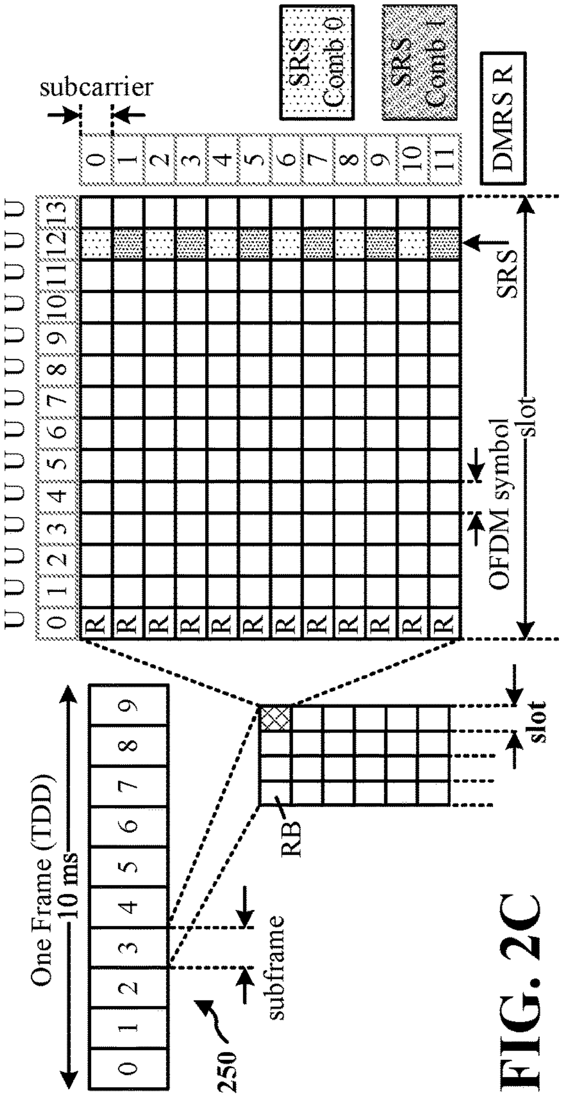
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu$*15 kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
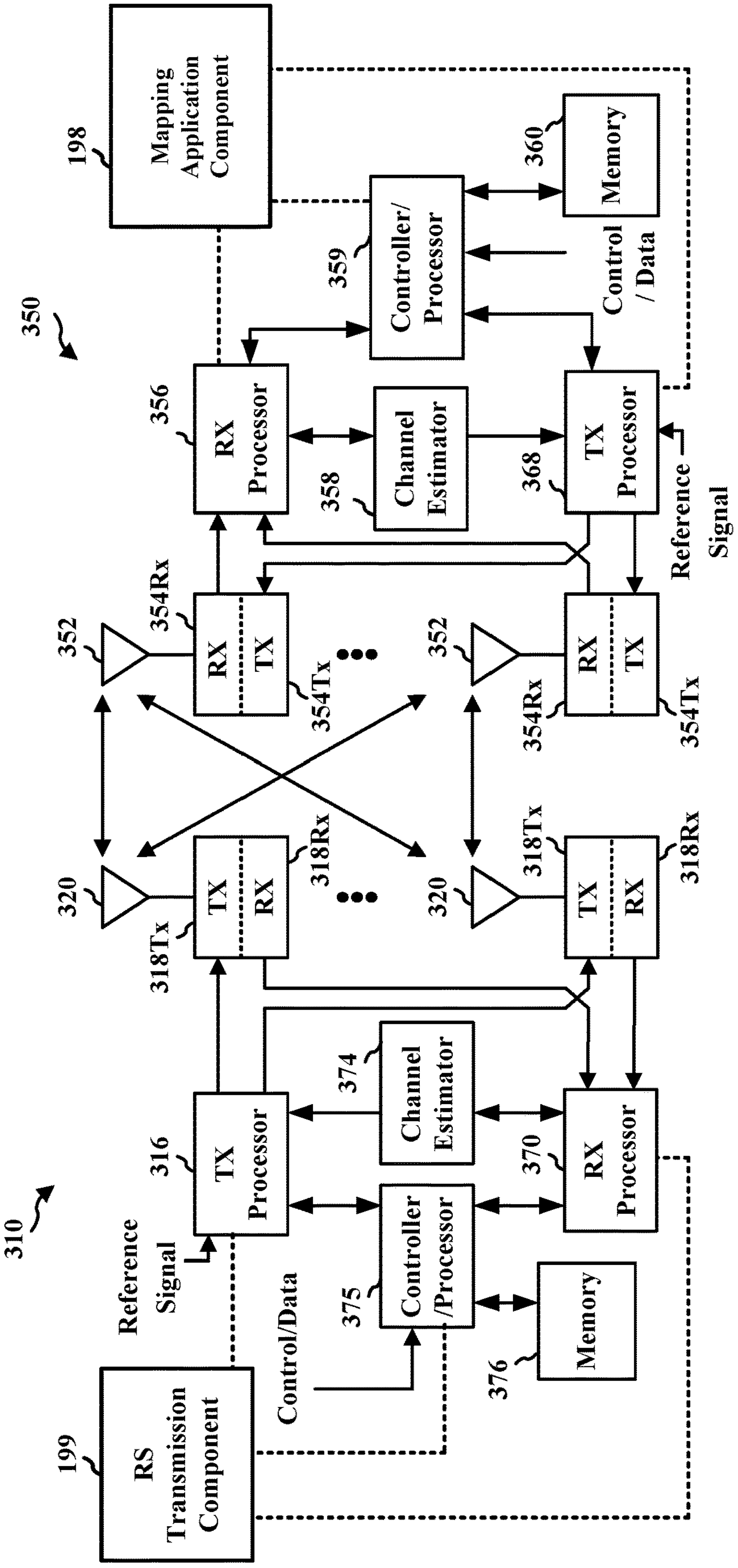
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB. SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the mapping application component 198 of FIG. 1.

At least one of the TX processor 316, the RX processor 370, and the controller/processor 375 may be configured to perform aspects in connection with the RS transmission component 199 of FIG. 1.

Figure 4:
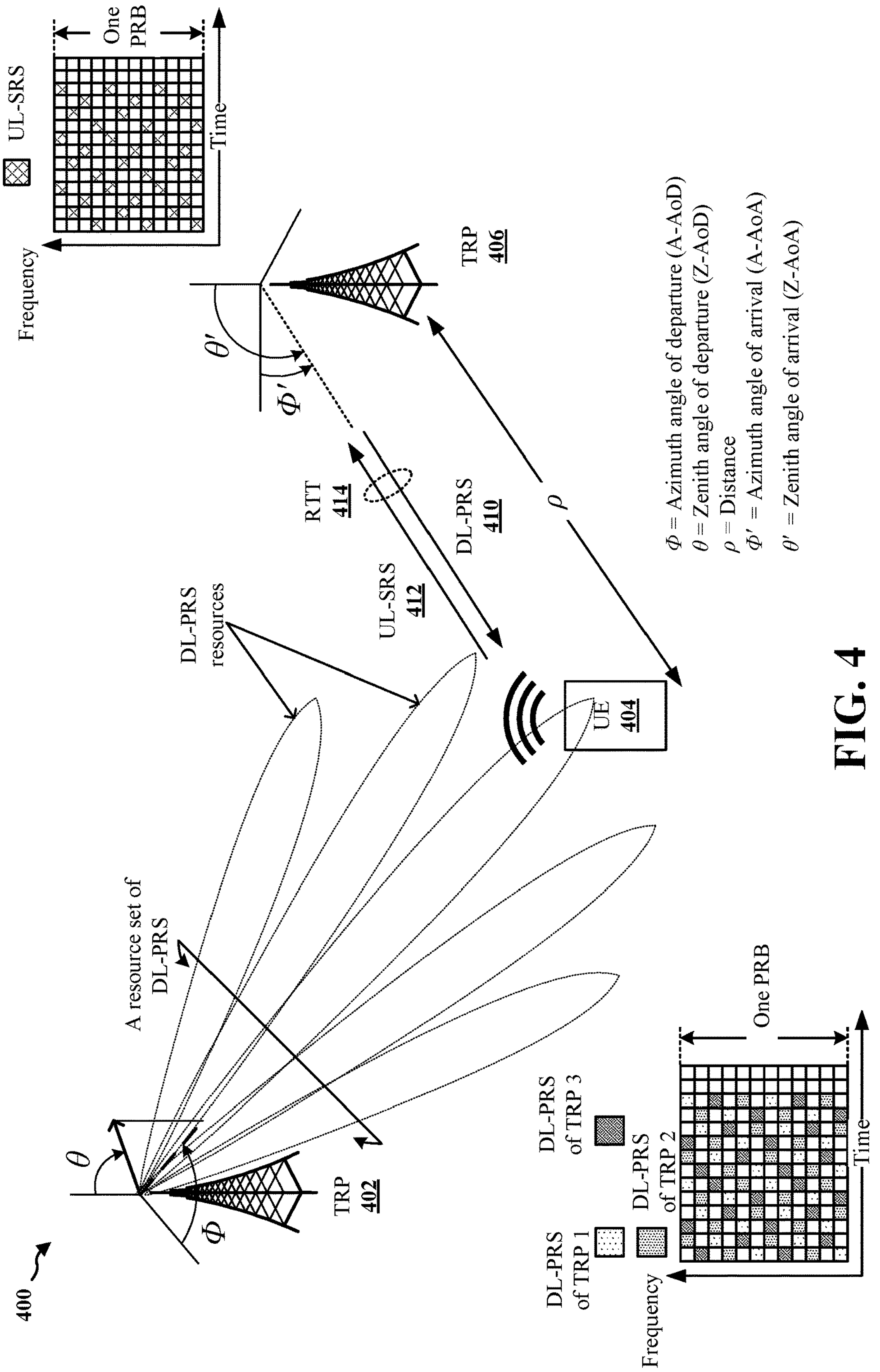
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS. SSS. SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In some implementations, at least one artificial intelligence (AI)/machine learning (ML)(AI/ML) model may be configured/implemented at a UE or at a network entity/node (e.g., a base station, a location server, a location management function (LMF), etc.) for assisting the UE and/or the network entity/node with the positioning of the UE. For example, an AI/ML model may be trained to determine the position of a UE based on DL-AoA, DL-TDOA, channel impulse response (CIR), radio frequency (RF) fingerprinting, etc. In most scenarios, using an AI/ML model may significantly improve UE positioning latency, accuracy/reliability, and/or efficiency. For purposes of the present disclosure, an AI/ML model that is implemented at a UE side may be referred to as a "UE-side model" and/or "UE-side AI/ML model." On the other hand, an AI/ML model that is implemented at a network side may be referred to as a "network-side model," "network-side AI/ML model," and/or (network name)-side AI/ML model (e.g., base station-side AI/ML model, LMF-side AI/ML model, etc.).

In addition, positioning that is associated with a UE or a network entity/node using an AI/ML model to determine the position of the UE may be referred to as "direct AI/ML positioning," whereas positioning that is associated with a UE or a network entity/node performing positioning related measurements using an AI/ML model (and transmitting the positioning related measurements to another entity) to determine the position of the UE may be referred to as "AI/ML assisted positioning" and/or "assisted AI/ML positioning." Also, UE-based positioning (e.g., UE determines its own position) using at least one UE-side AI/ML model may be referred to as "direct UE AI/ML positioning" and/or "UE direct AI/ML positioning," whereas UE-assisted positioning (e.g., a UE provides positioning measurements and a network entity, such as an LMF, determines the position for the UE based on the positioning measurements provided by the UE) using at least one UE-side AI/ML model may be referred to as "UE AI/ML assisted positioning," "UE assisted AI/ML positioning" "AI/ML assisted UE positioning," and/or "AI/ML UE assisted positioning," etc. Similarly, network-based positioning (e.g., a network entity, such as an LMF, determines the position for the UE) using at least one network/LMF-side AI/ML model may be referred to as "direct network/LMF AI/ML positioning" and/or "network/LMF direct AI/ML positioning."

Figure 5:
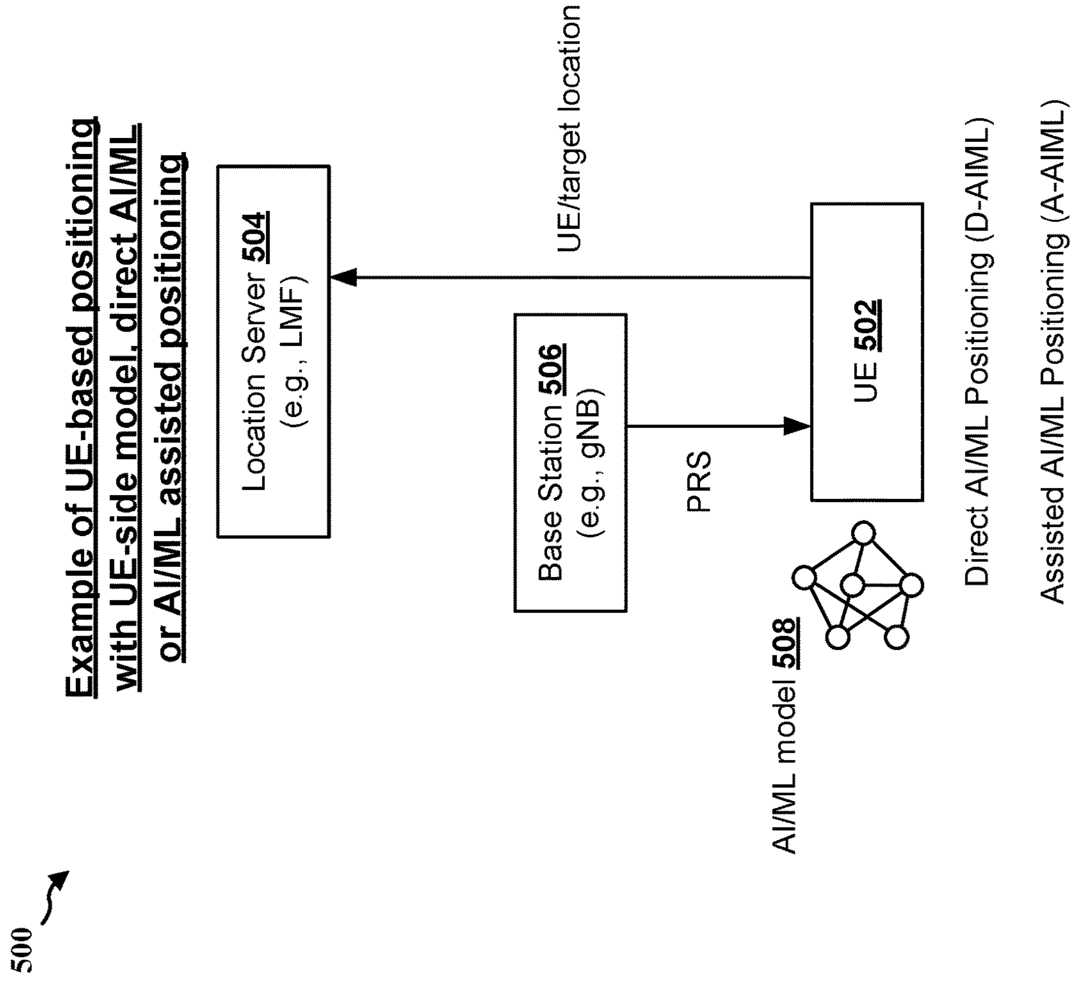
FIG. 5 is a diagram illustrating an example of UE-based positioning with UE-side AI/ML model, direct artificial intelligence (AI)/machine learning (ML)(AI/ML) or AI/ML assisted positioning in accordance with various aspects of the present disclosure.

FIG. 5 is a diagram 500 illustrating an example of UE-based positioning with UE-side AI/ML model, direct AI/ML or AI/ML assisted positioning in accordance with various aspects of the present disclosure. In one implementation, a UE 502 may be associated with at least one AI/ML model 508, and the UE 502 may use the at least one AI/ML model 508 to perform the direct AI/ML positioning and/or the assisted AI/ML positioning based on downlink (DL) reference signals, such as positioning reference signals (PRSs). For example, the UE 502 may receive and measure a set of PRSs transmitted from a base station 506, such as measuring the reference signal received power (RSRP), channel impulse response (CIR), DL-AoD, reference signal time difference (RSTD), time of arrival (ToA), and/or time of flight (ToF) of the set of PRSs, etc., which may be collectively be referred to as "PRS measurement(s)" and/or "PRS-based measurement(s)." In some examples, the UE 502 may use the at least one AI/ML model 508 for measuring the set of PRSs (e.g., for assisted AI/ML positioning). In some examples, based on the PRS measurement(s), the UE 502 may use the at least one AI/ML model 508 for determining its position (e.g., for direct AI/ML positioning). Note in this assisted AI/ML positioning example, the UE 502 may use the at least one AI/ML model 508 for performing PRS measurements, and the UE 502 may determine its position based on the PRS measurements without the assistance of an AI/ML model.

Figure 6A:
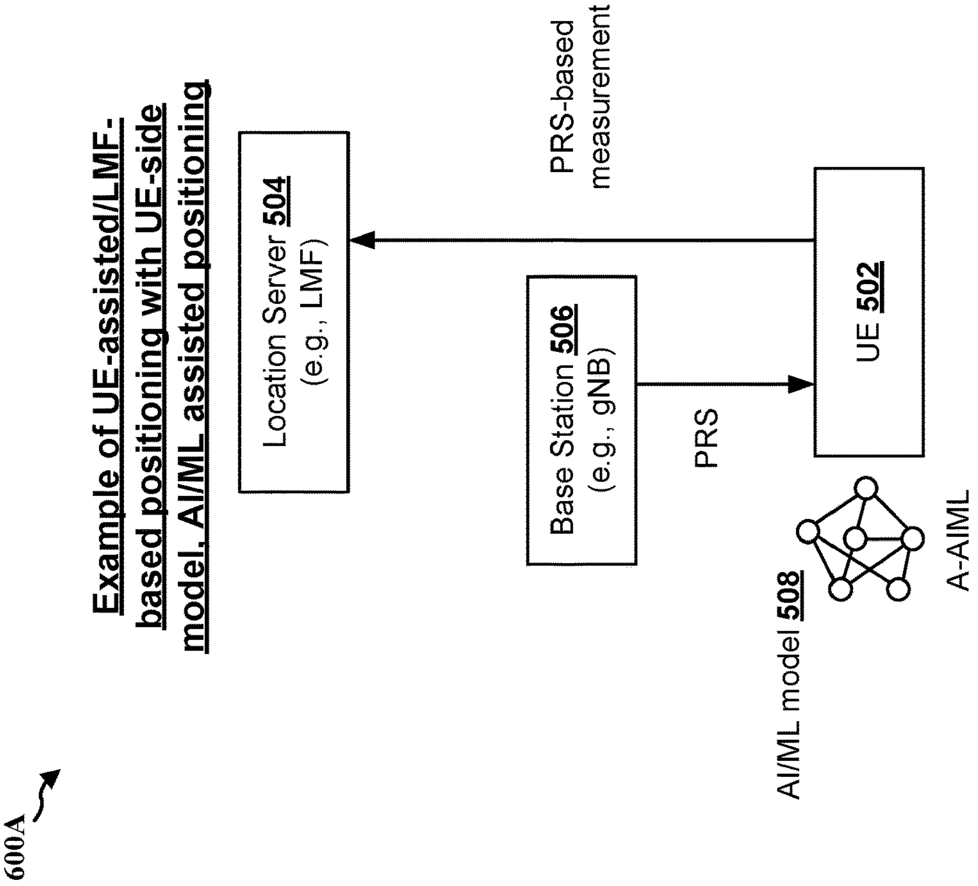
FIG. 6A is a diagram illustrating an example of UE-assisted/location management function (LMF)-based positioning with UE-side AI/ML model, AI/ML assisted positioning in accordance with various aspects of the present disclosure.

FIG. 6A is a diagram 600A illustrating an example of UE-assisted/LMF-based positioning with UE-side AI/ML model, AI/ML assisted positioning in accordance with various aspects of the present disclosure. In another implementation, a UE 502 may be associated with at least one AI/ML model 508, and the UE 502 may use the at least one AI/ML model 508 to perform or assist measurement(s) of DL reference signals. For example, the UE 502 may receive and measure a set of PRSs transmitted from a base station 506 with the assistance of the at least one AI/ML model 508, which may be referred to as "PRS-based measurement(s)." Then, the UE 502 may transmit the PRS-based measurement(s) to a location server 504, such as an LMF. In response, the location server 504 may determine the position of the UE 502 based on the PRS-based measurement(s) (with or without using an AI/ML model).

Figure 6B:
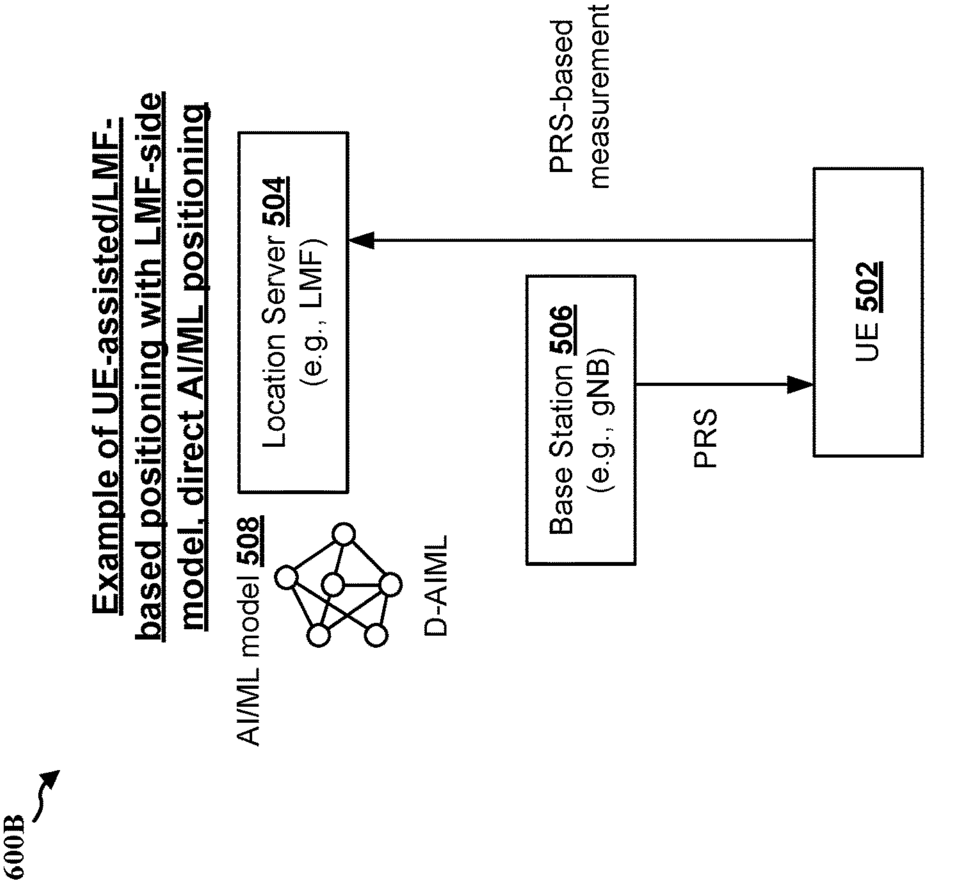
FIG. 6B is a diagram illustrating an example of UE-assisted/LMF-based positioning with LMF-side model, direct AI/ML positioning in accordance with various aspects of the present disclosure.

FIG. 6B is a diagram 600B illustrating an example of UE-assisted/LMF-based positioning with LMF-side AI/ML model, direct AI/ML positioning in accordance with various aspects of the present disclosure. In another implementation, a UE 502 may not include a UE-side AI/ML model, and a location server 504 may use at least one AI/ML model 508 to determine the position of the UE 502. For example, the UE 502 may receive and measure a set of PRSs transmitted from a base station 506, and the UE 502 may transmit the PRS-based measurement(s) to the location server 504, such as an LMF. In response, the location server 504 may use the at least one AI/ML model 508 to determine the position of the UE 502 based on the PRS-based measurement(s) from the UE 502.

Figure 7A:
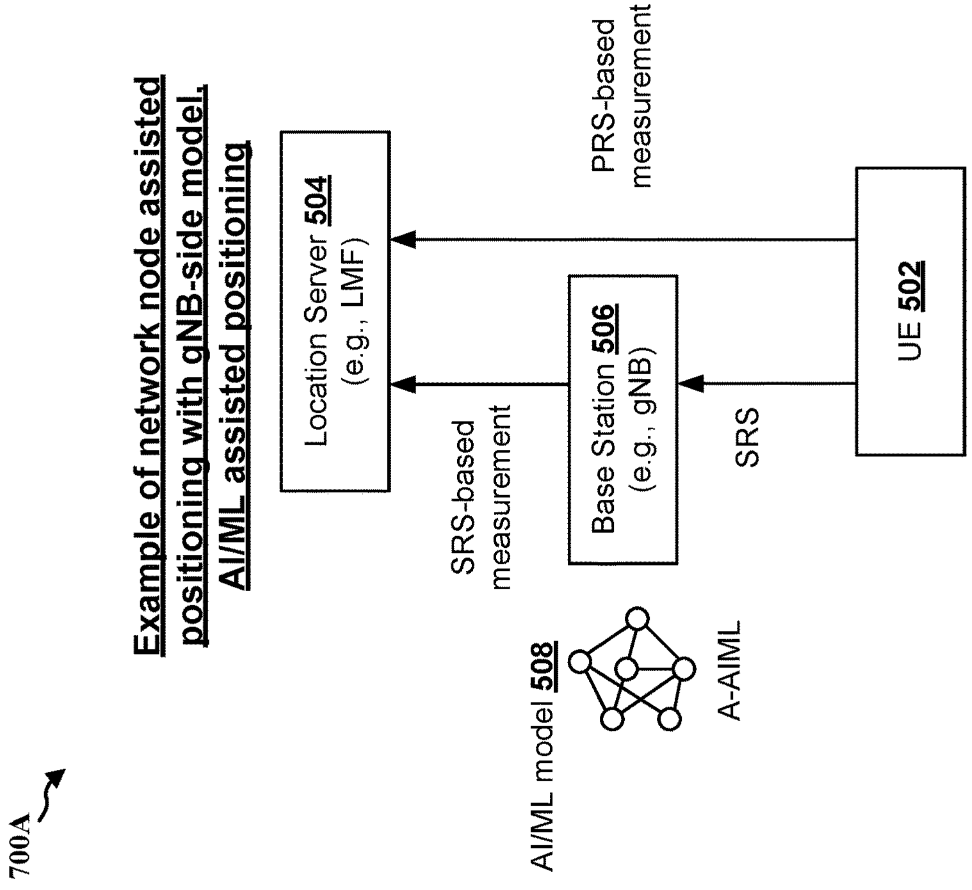
FIG. 7A is a diagram illustrating an example of network (e.g., a next generation (NG) radio access network (RAN) (NG-RAN)) node assisted positioning with gNB-side model, AI/ML assisted positioning in accordance with various aspects of the present disclosure.

FIG. 7A is a diagram 700A illustrating an example of network (e.g., NG-RAN) node assisted positioning with gNB-side AI/ML model, AI/ML assisted positioning in accordance with various aspects of the present disclosure. In another implementation, a network node, such as a base station 506, may be associated with at least one AI/ML model 508, and the base station 506 may use the at least one AI/ML model 508 to assist measurement(s) of uplink (UL) reference signals, such as sounding reference signals (SRSs). For example, the UE 502 may transmit a set of SRSs to the base station 506, and the base station 506 may receive and measure the set of SRSs (which may be referred to as "SRS-based measurement(s)") with the assistance of the at least one AI/ML model 508. Then, the base station 506 may transmit the SRS-based measurement(s) to the location server 504, such as an LMF. In response, the location server 504 may determine the position of the UE 502 based on the SRS-based measurement(s) from the base station 506 (with or without using an AI/ML model).

Figure 7B:
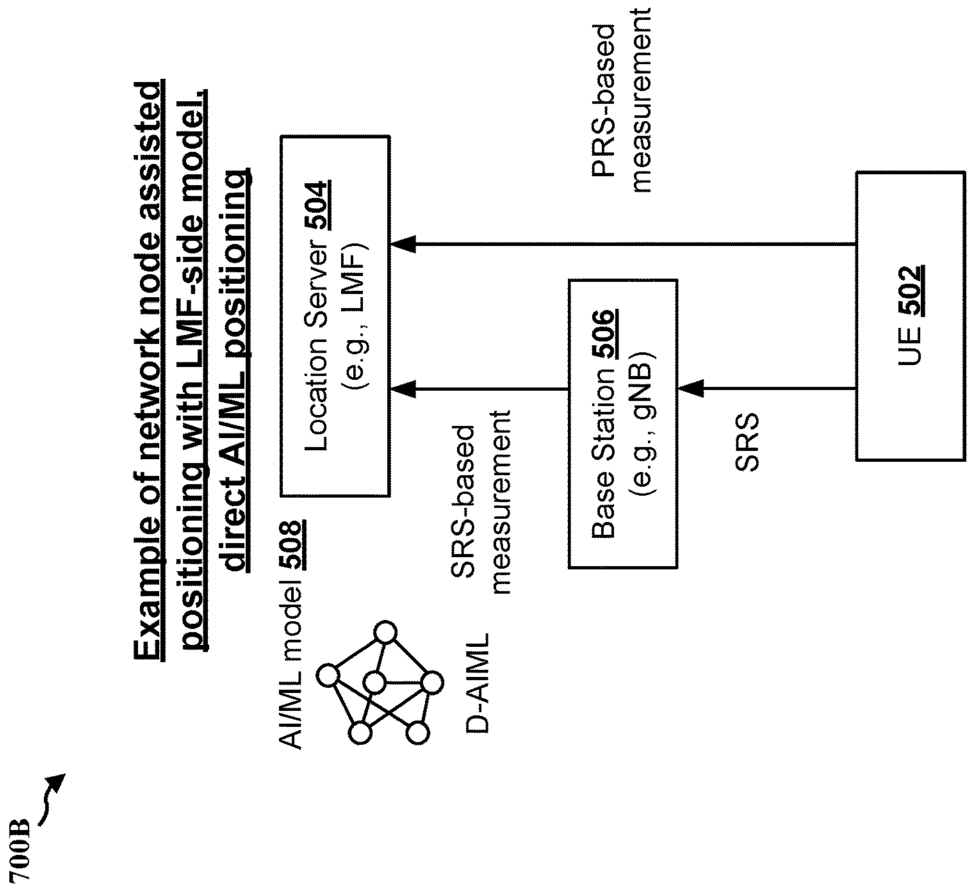
FIG. 7B is a diagram illustrating an example of network (e.g., NG-RAN) node assisted positioning with LMF-side model, direct AI/ML positioning in accordance with various aspects of the present disclosure.

FIG. 7B is a diagram 700B illustrating an example of network (e.g., NG-RAN) node assisted positioning with LMF-side AI/ML model, direct AI/ML positioning in accordance with various aspects of the present disclosure. In another implementation, a network node, such as a base station 506, may not include an AI/ML model, and a location server 504 may use at least one AI/ML model 508 to determine the position of a UE 502. For example, the UE 502 may transmit a set of SRSs to the base station 506, and the base station 506 may receive and measure the set of SRSs. Then, the base station 506 may transmit the SRS-based measurement(s) to the location server 504, such as an LMF. Based on the SRS-based measurement(s) from the base station 506, the location server 504 may use the at least one AI/ML model 508 to determine the position of the UE 502. For purposes of the present disclosure, positioning described in connection with FIGS. 5, 6A, and 6B may be referred to as AI/ML positioning based on DL reference signals, and positioning described in connection with FIGS. 7A and 7B may be referred to as AI/ML positioning based on UL reference signals.

Figure 8A:
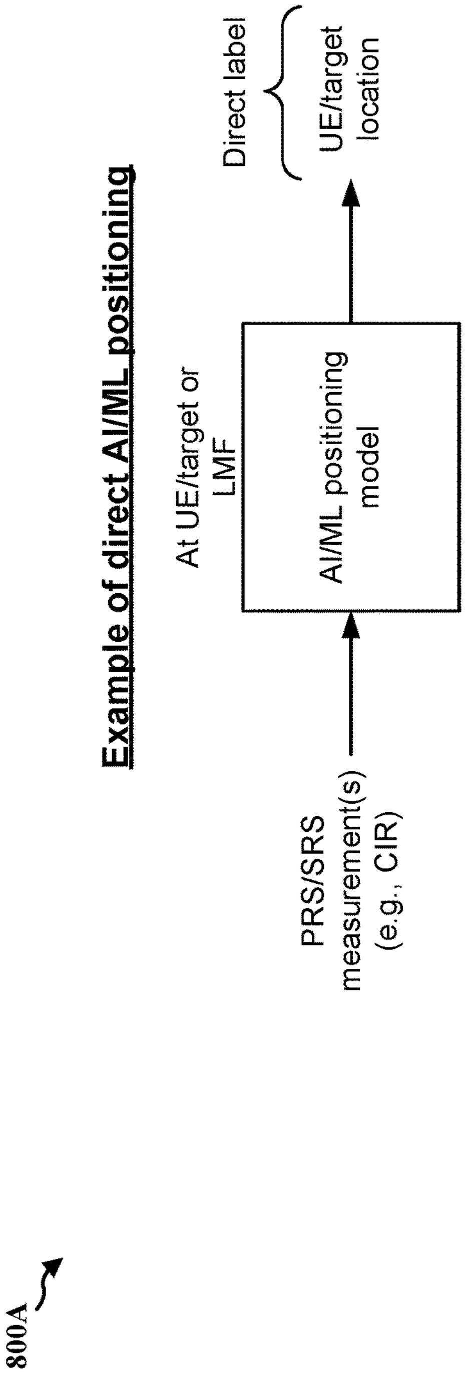
FIG. 8A is a diagram illustrating an example of direct AI/ML positioning in accordance with various aspects of the present disclosure.

FIG. 8A is a diagram 800A illustrating an example of direct AI/ML positioning in accordance with various aspects of the present disclosure. As described in connection with FIGS. 5, 6B, and 7B, for direct AI/ML positioning, a network entity (e.g., a UE, a location server, an LMF, etc.) may use at least one AI/ML model (e.g., the at least one AI/ML model 508) to determine the position of a UE or a target. For example, a UE may receive and measure PRSs transmitted from one or more base stations, and the UE may determine its position using an AI/ML model based on the PRS measurements. In another example, an LMF may receive PRS measurements from a UE or SRS measurements from a baes station, and the LMF may determine the position of the UE using an AI/ML model based on the PRS/SRS measurements.

Figure 8B:
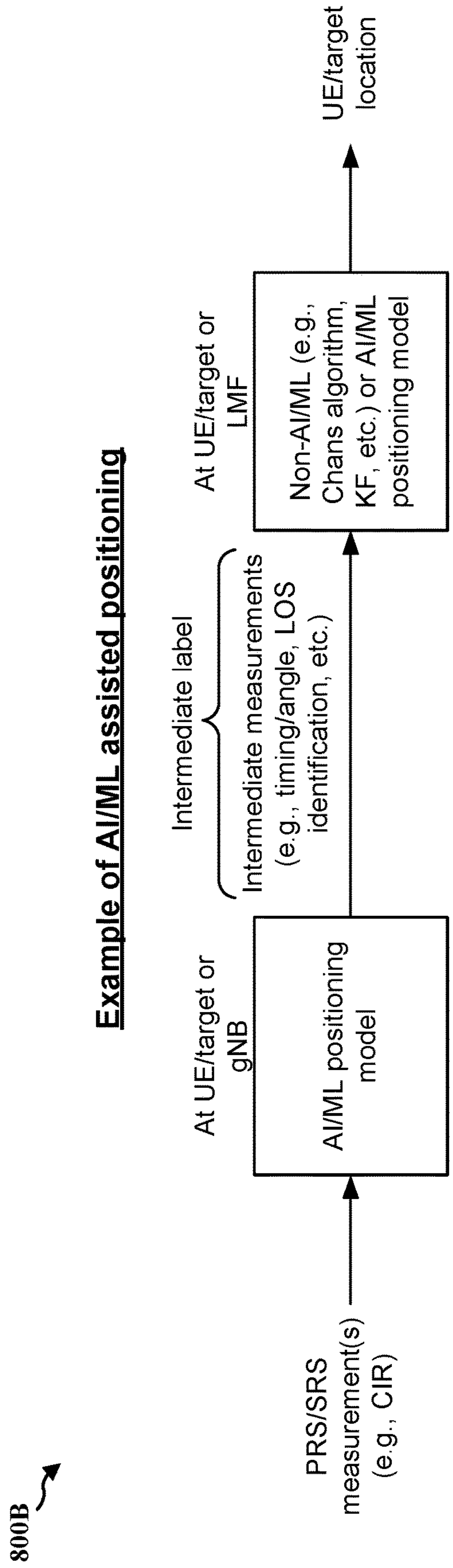
FIG. 8B is a diagram illustrating an example of AI/ML assisted positioning in accordance with various aspects of the present disclosure.

FIG. 8B is a diagram 800B illustrating an example of AI/ML assisted positioning in accordance with various aspects of the present disclosure. As described in connection with FIGS. 5, 6A, and 7A, for AI/ML assisted positioning, a network node/entity (e.g., a UE, a base station, etc.) may use at least one AI/ML model (e.g., the at least one AI/ML model 508) to assist measurement of reference signals (e.g., PRS, SRS, etc.). Then, the network node/entity may transmit the reference signal measurements to a location server, such as an LMF. In response, the location server may determine the position of the UE based on a non-AI/ML mechanism/algorithm, or based on using an AI/ML model to determine the position of the UE. For example, a UE may receive and measure PRSs transmitted from one or more base stations, and the UE may transmit the PRS measurements to an LMF. The PRS measurements may include intermediate measurements, such as timing and/or angle of the PRSs, whether the PRSs are received based on a line-of-sight (LOS) condition or a non-line-of-sight (NLOS) condition, etc. Then, the LMF may determine the position of the UE based on the PRS measurements (e.g., the intermediate measurements) with or without using an AI/ML model. Similarly, a base station may receive and measure SRSs transmitted from a UE, and the base station may transmit the SRS measurements to an LMF. Then, the LMF may determine the position of the UE based on the SRS measurements (e.g., the intermediate measurements) with or without using an AI/ML model.

In addition to network based positioning methods, such as described in connection with FIG. 4, the position of a UE may also be determined based on radio frequency (RF) fingerprints. In some scenarios, RF transmitted from a wireless device (e.g., a UE, a TRP, a wireless access point (AP), etc.) or from a group of wireless devices may contain one or more RF features/patterns that are different from another wireless device or another group of wireless devices. In other words, RF transmitted from a wireless device or from a group of wireless devices may be unique, and this unique feature/pattern associated with this RF may be referred to as an RF fingerprint. For purposes of the present disclosure, technology that is associated with RF fingerprint may be referred to as "RF fingerprinting" and/or "RFFP," and positioning methods associated with RF fingerprinting may be referred to as "RF fingerprinting-based positioning," "RFFP-based positioning," and/or "RFFP positioning." RF fingerprinting aims to develop a unique RF fingerprint for a wireless device that may be used as an identity, which may be similar to how a biological fingerprint operates. For example, an RF fingerprint may include radio measurements from multiple APs. e.g., received signal strengths (RSS)/received signal strength indicators (RSSI), path-loss, channel impulse response (CIR) measurements, power delay profile (PDP), delay profile (DP), and/or channel frequency response (CFR) measurements, etc., to provide a fingerprint of radio conditions at a specific location. Then, the location of a fingerprint may be estimated using the known location of similar fingerprints previously recorded. For example, RF fingerprints from different locations may be captured and recorded in a database. Thus, if an RF fingerprint captured by a wireless device matches an RF fingerprint stored in the database, the location of the wireless device may be estimated.

In some examples, the RF fingerprint database may be created and/or maintained based on AI/ML, and RFFP positioning with AI/ML may be referred to as AI/ML RFFP positioning. For AI/ML RFFP positioning, RF fingerprints and their associated positions may be used as features and labels, respectively, to train an AI/ML module in a supervised manner. After the AI/ML module is being trained, the AI/ML module may be used to estimate positions by passing it with newly captured RF fingerprints. In other words, an AI/ML module may be configured to collect RF fingerprints and their associated locations, and this process may be referred to as AI/ML position training or simply AI/ML training. After the AI/ML module is trained (e.g., RF fingerprints stored in the database are associated with known locations with certain level of certainties/accuracies), the AI/ML module may be used for estimating the location of a detected/captured RF fingerprint, and this process may be referred to as AI/ML position inference or simply AI/ML inference. In some examples, AI/ML position training/inference may be applied on UE side and/or on the network side. The RFFP AI/ML training and inference may also be based on millimeter wave (mmW or mm Wave), sub-THz, and/or THz frequencies.

Figure 9:
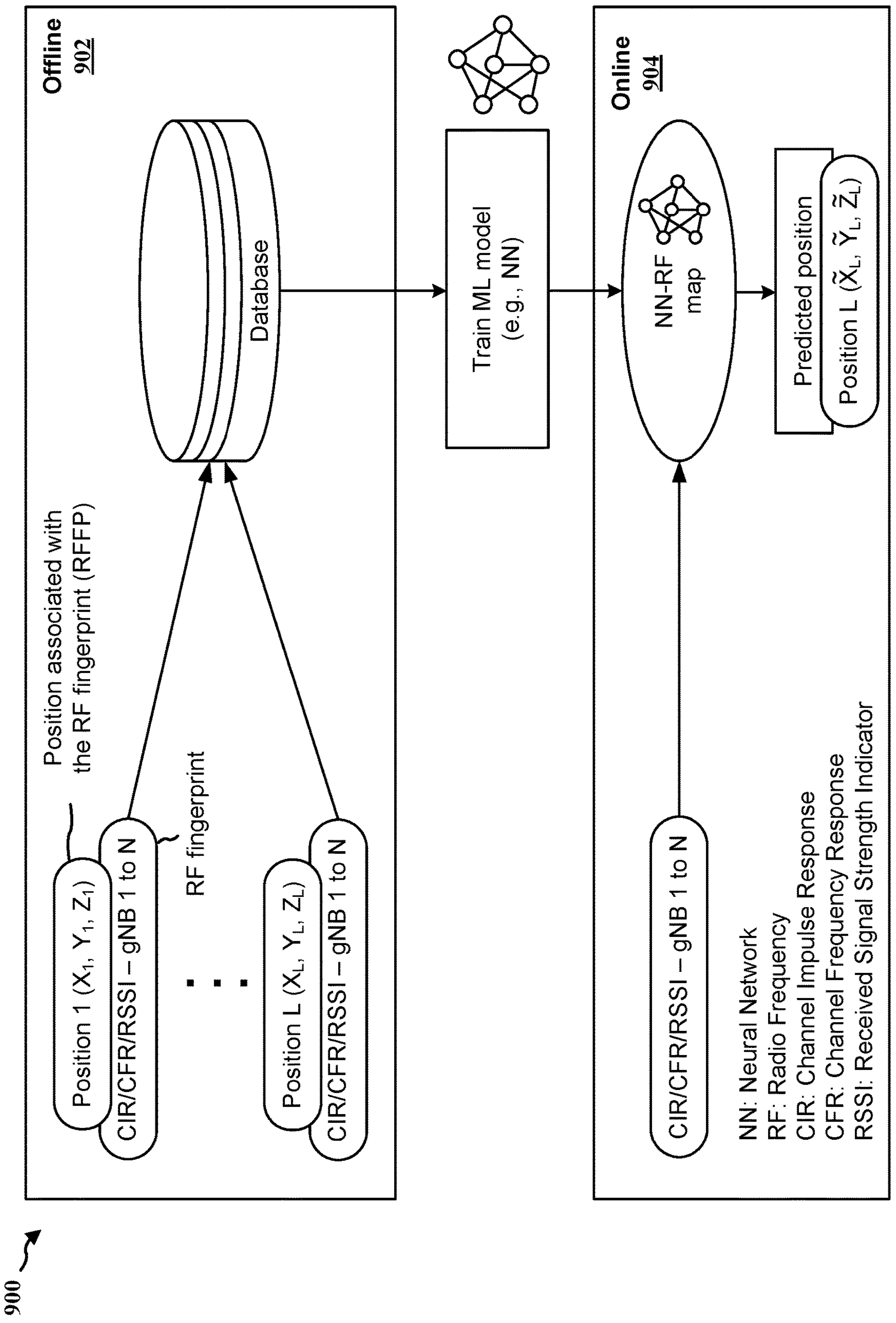
FIG. 9 is a diagram illustrating an example of AI/ML position training and inference for radio frequency fingerprinting (RFFP) in accordance with various aspects of the present disclosure.

FIG. 9 is a diagram 900 illustrating an example of AI/ML position training and inference for RFFP in accordance with various aspects of the present disclosure. During an offline stage 902 (which may also be referred to as a training stage), a database may be configured to collect RF fingerprints, such as channel impulse responses (CIRs), channel frequency responses (CFRs), and/or received signal strength indicators (RSSIs) and their associated locations (e.g., locations in which the CIRs/CFRs/RSSIs are captured). As such, each fingerprint in the database may be associated to a known location, such as corresponding to a local coordinate (X, Y) or (X, Y, Z), a global coordinate (latitude, longitude), a ground truth location, an address, and/or a label, etc. The collection of RF fingerprints may be based on site surveying, crowdsourcing, or by other means. After the RF fingerprints and their associated locations are collected, the database may process them and create a mapping between the RF fingerprints and their associated locations. The mapping may be accessed by a neural network (NN) or an ML module associated with the NN.

At an online stage 904 (which may also be referred to as an operational stage or a training stage), the NN or the AI/ML module may receive RF fingerprint captured by a wireless device that has an unknown location. The NN may compare the RF fingerprint with unknown location to the mapping, select one or more RF fingerprints from the mapping that are similar to the RF fingerprint with unknown location, and computer an estimated position for the wireless device. Throughout the process, the NN or the AI/ML module may continue to update the mapping to increase the accuracy of the position estimation.

A positioning frequency layer (PFL) (or a "frequency layer" in some examples) may refer to a collection of one or more PRS resource sets across one or more TRPs that have the same values for certain parameters. A PFL may include one or more TRPs, and each TRP in the one or more TRPs may include one or more resource sets, and each resource set in the one or more resource sets may include one or more PRS resources, etc. In some examples, the collection of PRS resource sets may have the same subcarrier spacing and cyclic prefix (CP) type (e.g., meaning all numerologies supported for PDSCHs are also supported for PRS), the same value of the downlink PRS bandwidth, the same start physical resource block (PRB) (and center frequency), and/or the same comb-size, etc. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

In some implementations, the concept of a PFL may be similar to a component carrier (CC) and a BWP, where CCs and BWPs may be used by one base station (or a macro cell base station and a small cell base station) to transmit data channels, while PFLs may be used by multiple (e.g., three or more) base stations to transmit PRS. A UE may indicate the number of PFLs it is capable of supporting when the UE sends the network its positioning capabilities, such as during a positioning protocol session. For example, a UE may indicate whether it is capable of supporting one, two, three, or four PFLs.

In some scenarios, a UE may receive a plurality of PRS resources from multiple TRPs via one or more PFLs, where the UE may not have capabilities to process all of the plurality of PRS resources. As such, the UE may apply a predefined prioritization rule to prioritize measurements of PRS resources. Based on the predefined prioritization rule, the UE may measure a subset of the plurality of PRS resources, and the UE may skip measuring another subset of the plurality of PRS resources.

Figure 10:
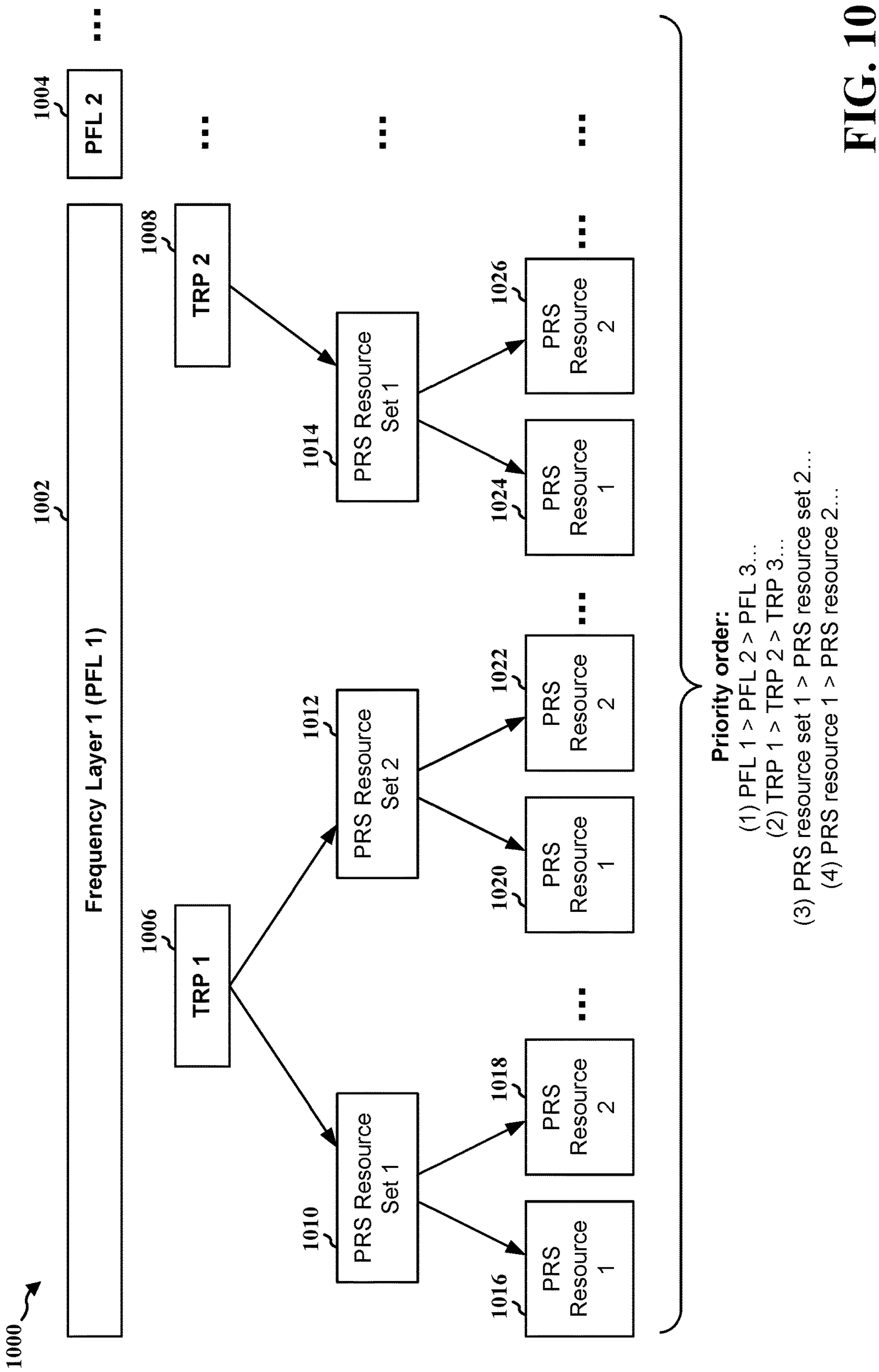
FIG. 10 is a diagram illustrating an example DL-positioning reference signal (PRS) (DL-PRS) resource prioritization in accordance with various aspects of the present disclosure.

FIG. 10 is a diagram 1000 illustrating an example DL PRS resource prioritization in accordance with various aspects of the present disclosure. A UE may be configured with a number of PRS resources in an assistance data of a positioning session, where the number of PRSs resources to be process by the UE may be beyond the processing capability of the UE. In one example, the UE may assume the DL PRS resources in the assistance data are sorted in a decreasing order of measurement priority. For example, if the UE is configured to receive or measure the DL PRS resources via multiple frequency layers (e.g., PFLs), where each PFL may include PRS resources transmitted from multiple TRPs. The UE may measure the DL PRS resources based on the priority associated with the multiple frequency layers (e.g., from a first frequency layer to a last frequency layer), based on the priority associated with the TRPs in each PFL (e.g., from a first TRP to a last TRP in a PFL), based on the priority associated with the PRS resource sets associated with each TRP (e.g., from a first PRS resource set to a last PRS resource set in a TRP), and based on the priority associated with the PRS resources within each PRS resource set (e.g., from a first PRS resource to a last PRS resource in a resource set), etc.

For example, as shown by the diagram 1000, the UE may be configured to receive DL PRSs from a first frequency layer 1002 (PFL 1) and a second frequency layer 1004 (PFL 2). The first frequency layer 1002 may include DL PRSs transmitted from a first TRP 1006 and a second TRP 1008, where the first TRP 1006 may transmit PRSs using a first PRS resource 1016 and a second PRS resource 1018 in a first PRS resource set 1010, and using a first PRS resource 1020 and a second PRS resource 1022 in a second PRS resource set 1012, and the second TRP 1008 may transmit PRSs using a first PRS resource 1024 and a second PRS resource 1026 in a first PRS resource set 1014. Similarly, the UE may also receive DL PRSs from the second frequency layer 1004 via multiple TRPs, PRS resource sets, and/or PRS resources.

In one example, if the UE does not have the capability to process all the configured PRS resources, the UE may be configured to receive or measure the PRSs received from the first frequency layer 1002 first before processing PRSs in the second frequency layer 1004. Similarly, if there are also a third frequency layer (PFL 3) and a fourth frequency layer (PFL 4), the UE may be configured to receive or measure the PRSs received from the first frequency layer 1002 first, then the PRSs received from the second frequency layer 1004, then the PRSs received from the third frequency layer, and then the PRSs received from the fourth frequency layer (e.g., PRSs are processed/measured based on PFL 1>PFL 2>PFL 3>PFL 4). If the UE does not have the capability to process/measure PRSs in a frequency layer, the UE may skip measuring the PRSs in that frequency layer. For example, if the UE is configured to receive the PRSs via the first frequency layer 1002 and the second frequency layer 1004 but the UE is just able to process/measure PRSs in the first frequency layer 1002, the UE may skip PRS measurements for the second frequency layer 1004.

Similarly, within a frequency layer, if the UE does not have the capability to process all the PRSs in the frequency layer, the UE may prioritize its PRS measurements based on the priorities associated with the TRPs. For example, the UE may be configured to receive or measure the PRSs received from the first TRP 1006 before processing PRSs from the second TRP 1008. Similarly, if there are also a third TRP (TRP 3) and a fourth TRP (TRP 4), the UE may be configured to receive or measure the PRSs received from the first TRP 1006, then receive or measure the PRSs from the second TRP 1008, then receive or measure the PRSs from the third TRP, and then receive or measure the PRSs from the fourth TRP (e.g., PRSs are processed/measured based on TRP 1>TRP 2>TRP 3>TRP 4 with a frequency layer). If the UE does not have the capability to process/measure PRSs from a TRP, the UE may skip measuring the PRSs in that TRP. For example, if the UE is configured to receive the PRSs via the first TRP 1006 and the second TRP 1008 via the first frequency layer 1002 but the UE is just able to process/measure PRSs in the first TRP 1006, the UE may skip PRS measurements for the second TRP 1008.

Furthermore, within a TRP, if the UE does not have the capability to process all the PRSs in that TRP, the UE may prioritize its PRS measurements based on the priorities associated with the PRS resource sets. For example, the UE may be configured to receive or measure the PRSs received from the first PRS resource set 1010 first before processing PRSs from the second PRS resource set 1012. Similarly, if there are also a third PRS resource set (PRS resource set 3) and a fourth PRS resource set (PRS resource set 4), the UE may be configured to receive or measure the PRSs received from the first PRS resource set 1010 first, then the PRSs received from the second PRS resource set 1012, then the PRSs received from the third PRS resource set, and then the PRSs received from the fourth PRS resource set (e.g., PRSs are processed/measured based on PRS resource set 1>PRS resource set 2>PRS resource set 3>PRS resource set 4 with a TRP). If the UE does not have the capability to process/measure PRSs in a PRS resource set, the UE may skip measuring the PRSs in that PRS resource set. For example, if the UE is configured to receive the PRSs via the first PRS resource set 1010 and the second PRS resource set 1012 from the first TRP 1006 but the UE is just able to process/measure PRSs in the first PRS resource set 1010, the UE may skip PRS measurements for the second PRS resource set 1012.

Lastly, within a PRS resource set, if the UE does not have the capability to process all the PRSs in that PRS resource set, the UE may prioritize its PRS measurements based on the priorities associated with the PRS resources. For example, the UE may be configured to receive or measure the PRSs received from the first PRS resource 1016 first before processing PRSs from the second PRS resource 1018. Similarly, if there are also a third PRS resource (PRS resource 3) and a fourth PRS resource (PRS resource 4), the UE may be configured to receive or measure the PRSs received from the first PRS resource 1016 first, then the PRSs received from the second PRS resource 1018, then the PRSs received from the third PRS resource, and then the PRSs received from the fourth PRS resource (e.g., PRSs are processed/measured based on PRS resource 1>PRS resource 2>PRS resource 3>PRS resource 4 with a PRS resource set). If the UE does not have the capability to process/measure PRSs in a PRS resource, the UE may skip measuring the PRSs in that PRS resource. For example, if the UE is configured to receive the PRSs via the first PRS resource 1016 and the second PRS resource 1018 of the first PRS resource set 1010 but the UE is just able to process/measure PRSs in the first PRS resource 1016, the UE may skip PRS measurements for the second PRS resource 1018.

As such, if a UE is configured with multiple PRS resources via multiple frequency layers, multiple TRPs, multiple PRS resource sets, and/or multiple PRS resources, the UE may sort the frequency layers (e.g., may be up to four frequency layers) according to a priority, sort the TRPs per frequency layer (e.g., may be up to sixty four (64) TRPs per frequency layer) also according to a priority, sort the PRS resource sets per TRP (e.g., may be up to two resource sets per TRP) according to a priority, and/or sort the PRS resource per PRS resource set (e.g., may be up to sixty four (64) PRS resources per PRS resource set). In other words, within a positioning frequency layer, the DL PRS resources may be sorted in the decreasing order of priority for measurement to be performed by the UE, with the reference indicated by nr-DL-PRS-ReferenceInfo being the highest priority for measurement, and the following priority is assumed: (1) up to 64 dl-PRS-IDs of the frequency layer are sorted according to priority; and (2) up to 2 DL PRS resource sets per dl-PRS-ID of the frequency layer are sorted according to priority.

In some implementations, a UE may expect that it will be configured with dl-PRS-ID each of which is defined such that it is associated with multiple DL PRS resource sets. The UE may expect that one of these dl-PRS-ID along with a nr-DL-PRS-ResourceSetID and a nr-DL-PRS-ResourceID-r16 can be used to uniquely identify a DL PRS resource. For purposes of the present disclosure, a dl-PRS-ID may refer to an ID that corresponds to a PFL, an nr-DL-PRS-ResourceSetID may refer to an ID that corresponds to a PRS resource set in a PFL, and an nr-DL-PRS-ResourceID-r16 may refer to an ID that corresponds to a PRS resource in a PRS resource set. In some examples, a UE may be configured by a network with nr-PhysCellID, nr-CellGlobalID, and nr-ARFCN associated with a dl-PRS-ID. Table 2 below shows a list of example parameters that may be associated with a PRS resource set or a PRS resource.

TABLE 2

List of example parameters for PRS resource sets and PRS resources

| NR-DL-PRS-ResourceSet | DL PRS resource |
|---|---|
| nr-DL-PRS-ResourceSetID | nr-DL-PRS-ResourceID |
| dl-PRS-Periodicity-and-ResourceSetSlotOffset | dl-PRS-SequenceID |
| dl-PRS-ResourceRepetitionFactor | dl-PRS-CombSizeN-AndReOffset |
| dl-PRS-ResourceTimeGap | dl-PRS-ResourceSlotOffset |
| dl-PRS-MutingOption1/dl-PRS-MutingOption2 | dl-PRS-ResourceSymbolOffset |
| NR-DL-PRS-SFN0-Offset | dl-PRS-QCL-Info |
| dl-PRS-ResourceList | |
| dl-PRS-ResourceBandwidth | |
| dl-PRS-StartPRB | |
| dl-PRS-NumSymbols | |

In some examples, a UE may be provided by a network with an indication of locations of one or more TRPs and/or angles (e.g., DL-AoD). For example, a UE may be provided with beam/antenna information via higher layer parameter NR-TRP-BeamAntennaInfo, and the UE may request to be provided with either expected DL-AoD/ZoD and uncertainty range(s) of expected DL-AoD/ZoD, or expected DL-AoA/ZoA and uncertainty range(s) of the expected DL-AoA/ZoA. The UE may be provided with expected DL-AoD/ZoD and uncertainty range(s) of the expected DL-AoD/ZoD. The UE may be provided with expected DL-AoA/ZoA and uncertainty range(s) of the expected DL-AoA/ZoA. However, while a UE may request a network to provide TRP location and/or PRS beam/antenna angle information, the network response may not be configured to be mandatory (e.g., may be optional). Similarly, the network may also be configured to provide Cell IDs and global Cell IDs to the UE optionally.

FIG. 11A is a diagram 1100A illustrating an example information element (IE) NR-TRP-LocationInfo that may be used by a location server (e.g., an LMF) to provide the coordinates of the antenna reference points for a set of TRPs to a UE in accordance with various aspects of the present disclosure. For each TRP, an antenna reference point (ARP) location may be provided for each associated PRS resource ID per PRS resource set. As shown at 1102, the location server may provide parameters related to TRP location(s) as an option, and not mandatory.

FIG. 11B is a diagram 1100B illustrating an example IE NR-UEB-TRP-LocationData that may be used in an assistance DataElement if the posSibType in IE PosSIB-Type indicates 'posSibType6-2' in accordance with various aspects of the present disclosure. As shown at 1104, parameters related to TRP beam(s) may also be configured to be an option, and not mandatory.

In some scenarios, the mapping between PRS resources (e.g., PFL ID(s), PRS resource set(s), and/or PRS resource(s)/signals, etc.) and actual deployment (e.g., cells/sites, TRPs, and/or beams, etc.) may be left for implementation and usually decided by a mobile network operator (MNO) or based on predefined network vendor setting(s). As such, over the lifecycle of a network operation for a given network deployment, an MNO may decide to change how different PRS resources map to TRPs/beams to enhance/modify performance.

Figure 12:
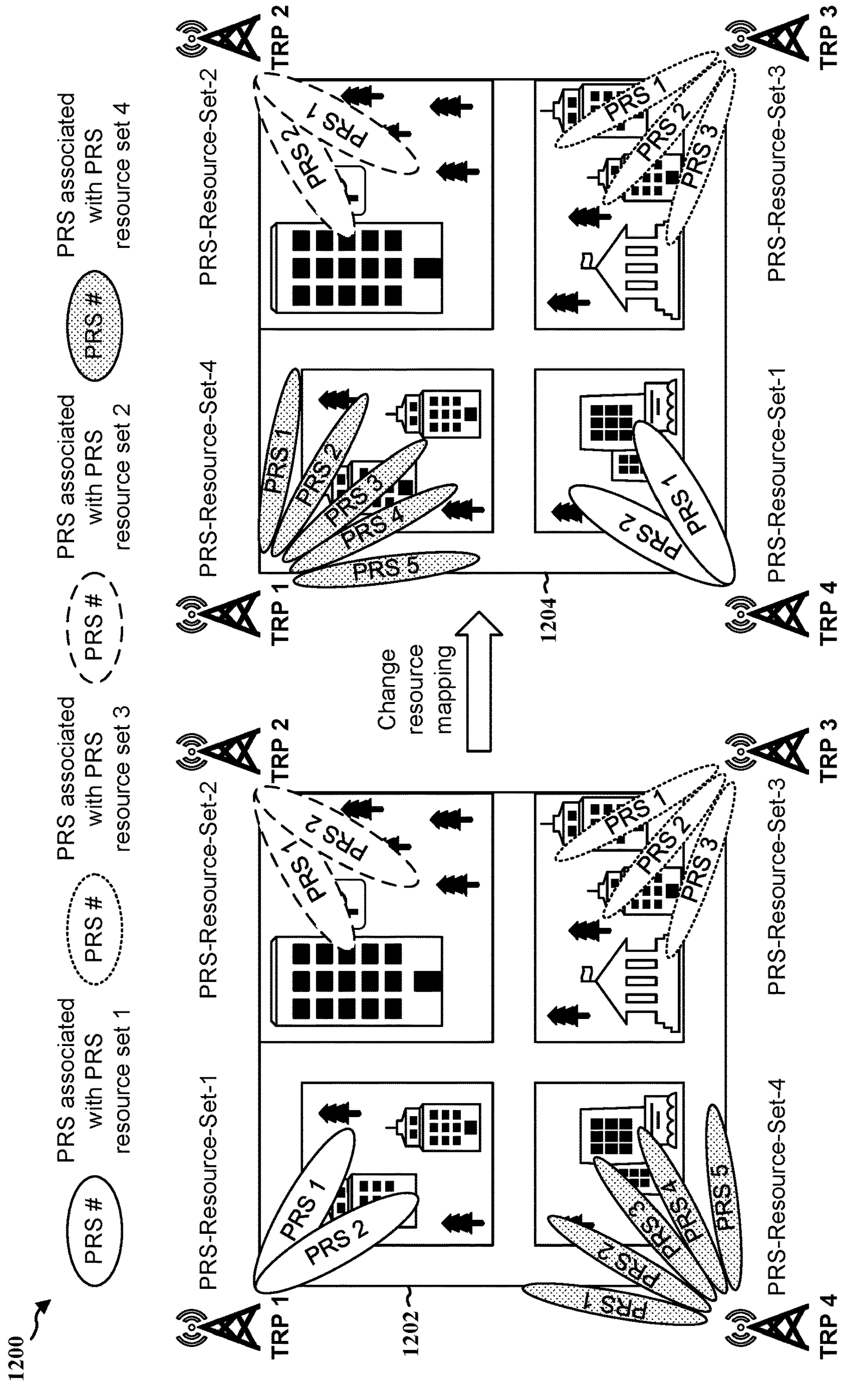
FIG. 12 is a diagram illustrating an example of a mobile network operator changing mapping between PRS resources and TRPs/beams in accordance with various aspects of the present disclosure.

FIG. 12 is a diagram 1200 illustrating an example of a mobile network operator changing mapping between PRS resources and TRPs/beams in accordance with various aspects of the present disclosure. As shown at 1202, at one point in time (or initially), a first TRP (TRP 1) may be configured to transmit a first PRS resource set (PRS resource set 1), where the first TRP may transmit a first PRS resource (PRS 1) using a first beam and transmit a second PRS resource (PRS 2) using a second beam. Similarly, a fourth TRP (TRP 4) may be configured to transmit a fourth PRS resource set (PRS resource set 4), where the fourth TRP may transmit five PRS resources (PRSs 1 to 5) via five beams.

As shown at 1204, at another point in time (e.g., after a period of time), the mobile network operator may modify the mapping between the PRS resource sets/resources and TRPs, where now the first TRP (TRP 1) may be configured to transmit the fourth PRS resource set (PRS resource set 4), and transmit five PRS resources (PRSs 1 to 5) via five beams. Similarly, the fourth TRP (TRP 4) may now be configured to transmit the first PRS resource set (PRS resource set 1) instead, and transmit the first PRS resource (PRS 1) using a first beam and transmit the second PRS resource (PRS 2), etc.

In some scenarios, the mobile network operator may also modify the mapping between TRP beams and PRS resources. For example, as shown at 1202, a second TRP (TRP 2) that is configured to transmit the second PRS resource set (PRS resource set 2) may initially transmit a first PRS resource (PRS 1) using a first beam and a second PRS resource (PRS 2) using a second beam. However, as shown at 1204, after a period of time, the second TRP (TRP 2) may still be configured to transmit the second PRS resource set (PRS resource set 2), but the second TRP may now be configured to transmit the first PRS resource (PRS 1) using the second beam, and transmit the second PRS resource (PRS 2) using the first beam instead. In some scenarios, the aforementioned changes in mapping (e.g., by the mobile network operator) may be transparent to a UE (e.g., meaning the UE may not be aware of the changes). Thus, a UE may still receive the same PRS configurations but may not know whether mapping or PRS resources to physical anchors and/or beam angle has changed.

Figure 13:
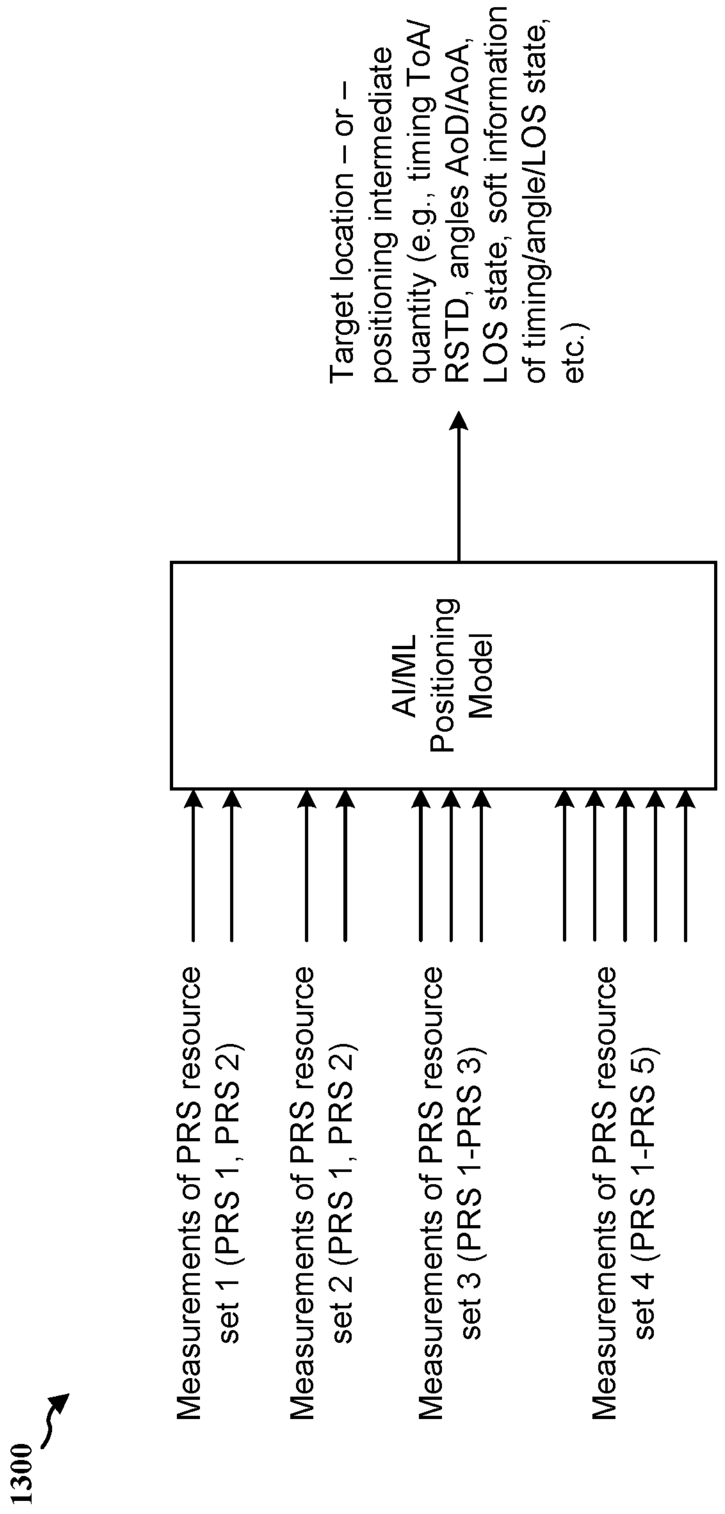
FIG. 13 is a diagram illustrating an example of inputting PRS measurements to an AI/ML model for estimating a target location or to obtain positioning intermediate quantity in accordance with various aspects of the present disclosure.

FIG. 13 is a diagram 1300 illustrating an example of inputting PRS measurements to an AI/ML model for estimating a target location or to obtain positioning intermediate quantity in accordance with various aspects of the present disclosure. As described in connection with FIGS. 5, 6A, 6B, 7A, 7B, 8A, and 8B, an AI/ML positioning model may receive PRS measurements from a plurality of network nodes (e.g., TRPs in FIG. 12), and the AI/ML positioning model may be used to estimate the location of a target (e.g., a UE) or to obtain positioning intermediate quantity, such as timing ToA/ToF/RSTD, angles AoD/AoA, LOS state, soft information of timing/angle/LOS state, etc. Soft information may refer to a probability, a likelihood, or parameters for a probability distribution, etc.

While changes in PRS and TRP mapping described in connection with FIG. 12 may not affect UE positioning, such as UE-assisted positioning (or classical positioning schemes described in connection with FIG. 4), the changes may highly degrade AI/ML-based positioning. For example, as described in connection with FIGS. 9 and 13, an AI/ML model or an AI/ML positioning model may usually be trained to learn site specific features, such as RF fingerprints from a set of network nodes (e.g., TRPs). Thus, the AI/ML model input construction (e.g., for training and/or inferencing) may be sensitive to the mapping between PRS resource(s) and anchor (e.g., TRP) locations and/or their beam angle information. In other words, as the AI/ML model may be trained based on a specified/first PRS and TRP mapping (e.g., as shown at 1202 of FIG. 12). If the PRS and TRP mapping changes (e.g., as shown at 1204 of FIG. 12), the performance of the AI/ML model may be degraded.

Thus, it may be quite important to let a UE aware/know when changes in mapping between PRS resource(s) and TRP location(s)/beam angle(s) occur. This may enable/helps the UE to better align input of the AI/ML model and/or to pick the suitable/right AI/ML model parameter(s) and configuration(s). However, due to proprietary, privacy, and/or implementation reasons, MNOs usually do not disclose TRP locations and/or beam angle information to UEs. In addition, such disclosure is also not mandatory (e.g., not being specified in a specification).

Aspects presented herein may improve and maintain the accuracy and performance of AI/ML positioning by enabling a UE to be aware of changes in mapping between PRS resource(s) and TRP location(s)/beam angle(s) without specifying mobile network operators to disclose the locations and beam angle information of their TRPs, thereby enabling the mobile network operators to maintain the privacy of their TRPs. For example, in one aspect of the present disclosure, a network (NW) may indicate, to or for a UE, a mapping (which may also be referred to as a "virtual map" or "virtual mapping") between PRS resources and TRP locations/beam information that does not disclose the actual/exact TRP locations/beam information, and/or does not specify disclosure of cells physical and global IDs, etc. This may enable a UE to decide how to map PRS measurements to its AI/ML model and/or update and switch the AI/ML model (as applicable). For purposes of the present disclosure, when a first entity transmits a transmission (e.g., a mapping, an indication, a configuration, a request, a data, etc.) "for" a second entity, it may indicate that the first entity is transmitting the transmission directly to the second entity, and/or that that the first entity is transmitting the transmission to the second entity via at least one other entity or component (e.g., via a third entity, via a transmission component that may not be in proximity to the first entity). For example, when a network entity (e.g., an LMF) transmits a mapping for a UE, it may refer that the network entity is transmitting the mapping directly to the UE, or indirectly to the UE via another network node such as a base station or via a transmitter that is not co-located with the network entity.

In one example, a network may be configured to maintain a "unique" indexing for cells/sites/TRPs and their beams, and the network may indicate how PRS resources (e.g., PFL ID(s), Set ID(s), PRS ID(s)) map to the cells/sites/TRPs and their beams based on this indexing. Thus, the network may be configured to just provide, to a UE, the mapping between its established indexing of TRPs/beams and PRS resources (e.g., PFL ID(s), Set ID(s), PRS ID(s)). In some implementations, the network may consider an outer loop to update the UE for any change in the indexing (e.g., maintenance of indexing if specified). However, this may not be expected to occur too frequently, and the frequency is likely longer than the lifecycle of an AI/ML positioning model.

When a network decides to change/modify the mapping of PRS resources to TRP locations/beams, the network may send, to a UE, an updated map/mapping on how PRS PFLs/Set IDs/PRS IDs map to the cells/sites/TRPs and their beams. In some scenarios, the network may also just indicate a flag that informs the UE that the mapping of PRS resources to TRP locations/beams has been changed. Then, the network may wait for the UE to request a detailed indication of the updated map. In other words, the network may be configured to provide the updated map just upon the request of the UE.

Figure 14:
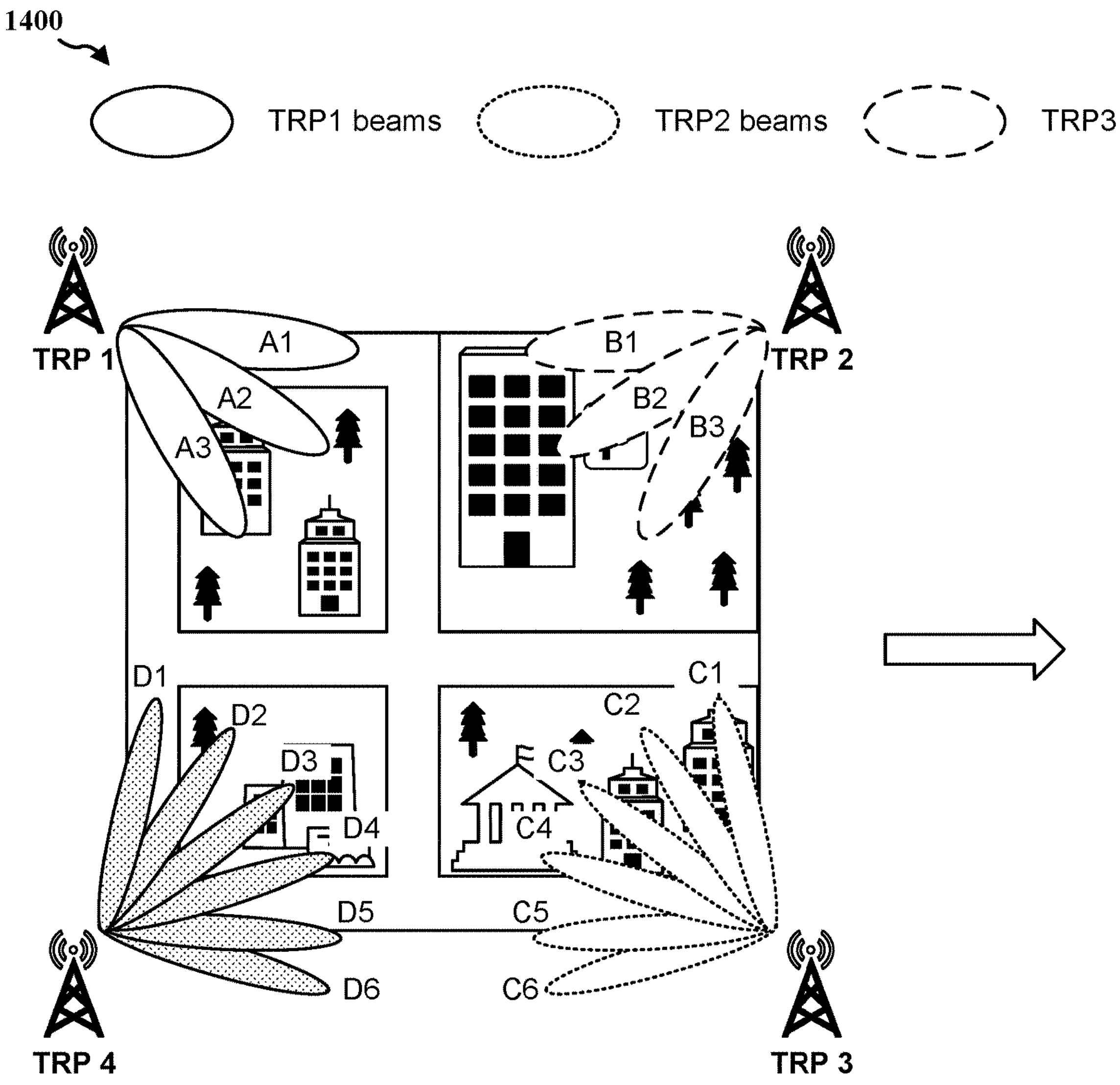
FIG. 14 is a diagram illustrating an example of PRS resource and TRP location/beam indexing map in accordance with various aspects of the present disclosure.

FIG. 14 is a diagram 1400 illustrating an example of PRS resource and TRP location/beam indexing map in accordance with various aspects of the present disclosure. As shown at 1402, a network may establish/configure an indexing (e.g., a unique indexing, a proprietary indexing, etc.) for its cells, TRPs, and/or beams for a given area/neighborhood. For example, a first beam of a first TRP may be assigned with an index (A1) and/or a bitmap (000001), a second beam of a first TRP may be assigned with an index (A2) and/or a bitmap (000010), and a first beam of a second TRP may be assigned with an index (B1) and/or a bitmap (000100), etc. As such, each beam of all beams of TRPs (e.g., TRPs 1 to 4) may be associated with an index or bitmap that is different from another beam.

FIG. 15A is a diagram 1500A illustrating an example mapping (e.g., initially or at a first point in time) of indexing and PRS resources in accordance with various aspects of the present disclosure. After assigning an index/bitmap for each beam of all beams of TRPs with an index, the network entity may associate each index with a PRS resource. For example, the network may associate the index A1, which corresponds to the first beam of the first TRP as shown by FIG. 14, with a PRS resource with PRS resource set ID=3 and PRS resource ID=2; associate the index A2, which corresponds to the second beam of the first TRP as shown by FIG. 14, with a PRS resource with PRS resource set ID=3 and PRS resource ID=3, and associate the index B1, which corresponds to the first beam of the second TRP as shown by FIG. 14, with a PRS resource with PRS resource set ID=1 and PRS resource ID=1, etc. Aspects presented herein may also apply to PFLs if available/application (in addition to PRS resource sets and PRS resources). For example, the index A1 may map to a PRS resource with PFL ID=1, PRS resource set ID=3, and PRS resource ID=2. Such configuration may enable the UE to just see the mapping of PRS resources with the indexing, and that the network is not specified to disclose the locations and/or beam (angle) information of its TRPs/cells.

FIG. 15B is a diagram 1500B illustrating an example updated mapping (e.g., at a second point in time) of the indexing and PRS resources in accordance with various aspects of the present disclosure. After a certain period of time, or upon certain condition(s), the network may determine to update/modify/change its mapping. For example, as shown at 1502, the network may switch the PRS resource set IDs between index A1 to A3 with index C1 to C3. In another example, as shown at 1504, the network may rearrange/reassign the resource IDs (with a PRS resource set). For example, the PRS resource associated with index C1 may be changed from PRS resource set ID=4 and PRS resource ID=1 to PRS resource set ID=4 and PRS resource ID=2. In another example, as shown at 1506, the network may also determine to disable/bar certain beam(s). For example, the network may disable/bar the beam corresponding to the index C6 (e.g., a sixth beam of a third TRP as shown by FIG. 14) from operating (or from transmitting/receiving signals). Similarly, aspects presented herein may also apply to PFLs if available/application (in addition to PRS resource sets and PRS resources). For example, the network may change the PFL ID associated with an index. Then, the network may indicate the changes or the new mapping to a UE, such that the UE may be aware of the new mapping and update its AI/ML positioning model (also without specifying the network to disclose the locations and/or beam (angle) information of its TRPs/cells).

Aspects presented herein may provide better configuration(s) for UE-sided AI/ML positioning models, such as described in connection with FIGS. 5 and 6A, and also mapping of measurements (e.g., PRS measurements) to their inputs. Such configuration/implementation may ensure robustness and excellent performance for UE-sided AI/ML positioning models when the network changes PRS resource mapping to TRPs/cells and/or beams while maintaining the privacy of the network side proprietary and implementation information/details.

Figure 16:
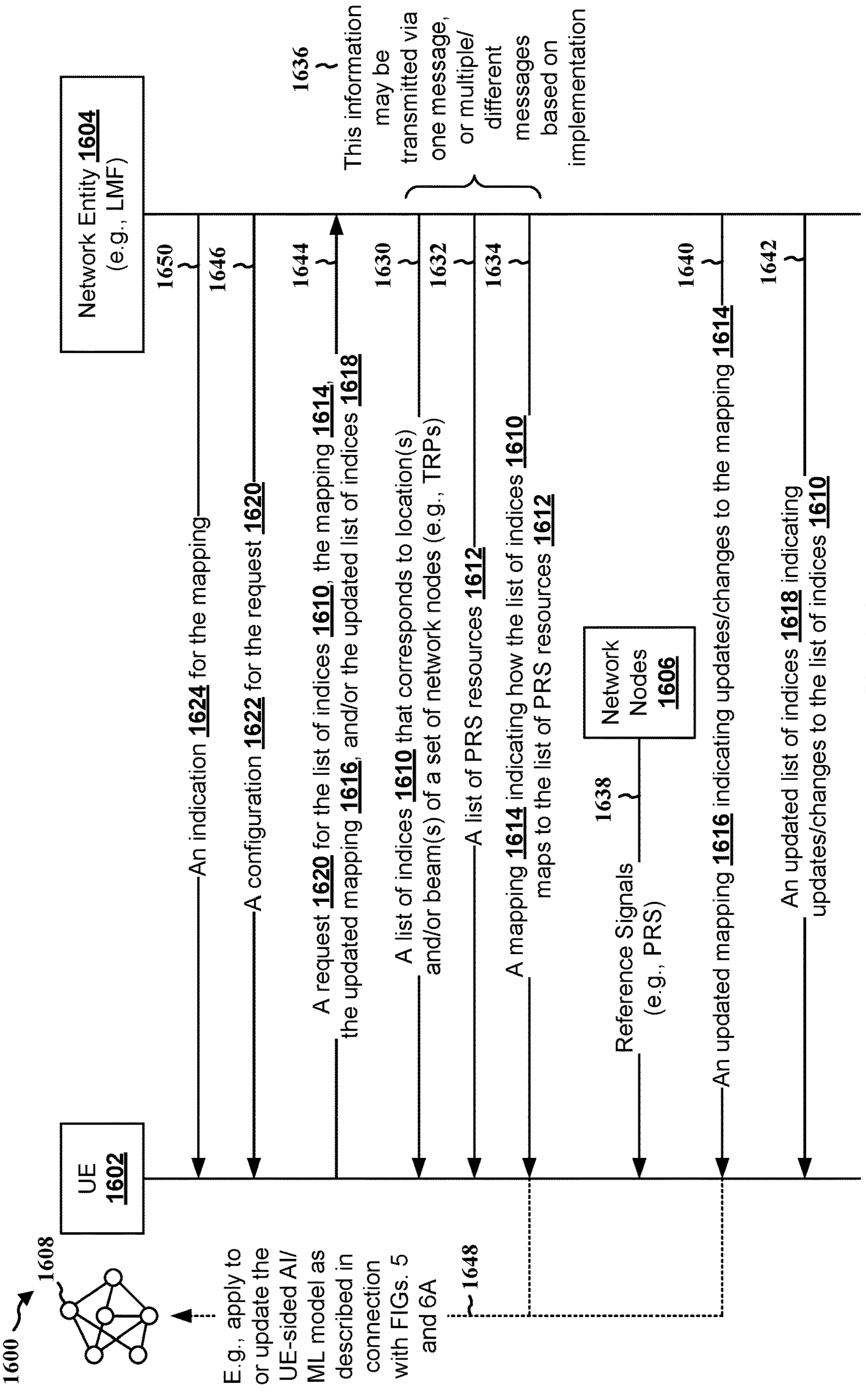
FIG. 16 is a communication flow illustrating an example of a network entity configuring or indicating mapping/indexing between PRS resource(s) and TRP location(s) and/or beam angle(s) in accordance with various aspects of the present disclosure.

FIG. 16 is a communication flow 1600 illustrating an example of a network entity configuring or indicating mapping/indexing between PRS resource(s) and TRP location(s) and/or beam angle(s) in accordance with various aspects of the present disclosure. The numberings associated with the communication flow 1600 do not specify a particular temporal order and are merely used as references for the communication flow 1600.

At 1630, a network entity 1604 (e.g., a location server, an LMF, etc.) may configure and transmit, to or for a UE 1602 (which may also be referred to as a "target" in some examples), a list of indices 1610 that corresponds to location(s) and/or beam(s) of a set of network nodes 1606 (e.g., a set of TRPs/cells/cites), such as described in connection with FIG. 14.

At 1632, the network entity 1604 may configure and transmit, to or for a UE 1602, a list of PRS resources 1612 (e.g., a list of PRS resources configured for the UE 1602), such as their corresponding PFL ID(s), PRS resource set ID(s), and/or PRS resources ID(s), etc. For example, the PRS configuration may be specified to map a PRS resource to a PRS resource set and PFL. Therefore, a configured PRS resource may already be under a determined PRS resource set and PFL. Thus, for a list of PRS resources, this list may also cover PRS resource set(s) and PFL(s).

At 1634, the network entity 1604 may configure and transmit, to or for a UE 1602, a mapping 1614 that indicates how the list of indices 1610 maps to the list of PRS resources 1612, such as described in connection with FIG. 15A.

As shown at 1636, the network entity 1604 may be configured to transmit the list of indices 1610, the list of PRS resources 1612, and the mapping 1614 in one message, or the network entity 1604 may be configured to transmit one or more of the list of indices 1610, the list of PRS resources 1612, and the mapping 1614 in one message in multiple/different messages depending on the implementation. For example, if the UE 1602 already has the list of indices 1610 (e.g., pre-defined at the UE 1602 or obtained via a prior communication, etc.), the network entity 1604 may be specified to just transmit the list of PRS resources 1612 and the mapping 1614 to the UE 1602 (via the same message or two different messages, etc.).

At 1638, the UE 1602 may receive a measure a set of PRSs from the set of network nodes 1606 (or from a subset of network nodes in the set of network nodes 1606), which may be referred to as PRS measurements. Then, the UE 1602 may transmit/provide/input the PRS measurements to an AI/ML positioning model 1608 for model training and/or inferencing, such as described in connection with FIGS. 5, 6A, 8A, 8B, and 9, where the model input for the AI/ML positioning model 1608 may be based on the list of indices 1610, the list of PRS resources 1612, and/or the mapping 1614, etc. In other words, the AI/ML positioning model 1608 may be trained and/or may perform inferencing without knowing locations and beam (angle) information of the set of network nodes 1606.

At 1640, when there is a change or update to the mapping between the list of indices 1610 and the list of PRS resources 1612 (e.g., after a period of time, after a change in deployment of TRPs, etc.), the network entity 1604 may transmit, to and for the UE 1602, an updated mapping 1616 that indicates the updates/changes to the mapping 1614. In some examples, the network entity 1604 may be configured to indicate the entire updated mapping 1616 to the UE 1602, such as shown at FIG. 15B. In other examples, the network entity 1604 may be configured to indicate just the difference(s) between the initial/previous mapping (e.g., the mapping 1614) and the new/updated mapping (e.g., the updated mapping 1616). For example, as discussed in connection with 1502, 1504, and 1506 of FIG. 15B, the network entity 1604 may just indicate the new/updated mapping for indices A1-A3, C1-C3, C6, and D1 to D3 to reduce signaling overhead.

In some scenarios, as shown at 1642, when there is a change or update to the list of indices 1610, the network entity 1604 may transmit, to and for the UE 1602, an updated list of indices 1618 that indicates the updates/changes to the list of indices 1610. Similarly, the network entity 1604 may be configured to indicate the entire updated list of indices 1618, or just the difference(s) between the initial/previous indexing (e.g., the list of indices 1610) and the new/updated indexing (e.g., the updated list of indices 1618) to reduce signaling overhead.

In some implementations, as shown at 1644, the network entity 1604 may be configured to transmit/provide, to or for the UE 1602, the list of indices 1610, the mapping 1614, the updated mapping 1616, and/or the updated list of indices 1618 based on the request of the UE 1602. For example, the UE 1602 may transmit, to the network entity 1604, a request for at least one of the list of indices 1610, the mapping 1614, the updated mapping 1616, and/or the updated list of indices 1618. Then, the network entity 1604 may transmit the list of indices 1610, the mapping 1614, the updated mapping 1616, and/or the updated list of indices 1618 based on the request 1620.

In another example, as shown at 1646, the network entity 1604 may transmit, to or for the UE 1602, a configuration 1622 associated with the request 1620. For example, the configuration 1622 may configure the UE 1602 on how often and/or when to send the request. For example, the configuration 1622 may configure the UE 1602 with a periodicity to transmit the request 1620 (e.g., every 10 days, every month, etc.), a condition or a triggering event (e.g., event-based) for transmitting the request 1620 (e.g., when the UE 1602 moves to an area with new TRPs, the number of handover (HO) performed by the UE 1602 exceeds a number threshold, etc.), and/or time-expiration condition(s) for stop transmitting the request 1620 (e.g., the UE 1602 may transmit the request 1620 until a time period expires, or until a defined condition is met, such as the UE 1602 leaving the area covered by the set of network nodes 1606), etc.

In some examples, as shown at 1648, the UE 1602 may select, decide, and/or configure a UE-sided AI/ML positioning model (e.g., the AI/ML positioning model 1608) based on the mapping 1614 (e.g., the first/initial mapping) and/or the updated mapping 1616 (e.g., the second/updated mapping). In some examples, at least for training data collection purposes, the mapping 1614 may be incorporated as part of the training data used to train the UE-sided AI/ML positioning model.

In another aspect of the present disclosure, the network entity 1604 may be configured to provide a simple indication of change in the mapping or an indication of the presence of the mapping. For example, as shown at 1650, the network entity 1604 may configure and transmit an indication 1624, to or for the UE 1602, where the indication 1624 may indicate that a mapping (e.g., the mapping 1614, or a previous implementation (existence) of the mapping 1614) has been set for associating PRS resources to location and beams of the set of network nodes 1606. In other words, instead of transmitting the list of indices 1610, the list of PRS resources 1612, and/or the mapping 1614 (or the updated mapping 1616) to the UE 1602, the network entity 1604 may first indicate/inform the UE 1602 regarding the existence of the list of indices 1610, the list of PRS resources 1612, and/or the mapping 1614, etc. In some examples, the indication 1624 may be a simple one-bit flag (e.g., bit 1 indicates a mapping between PRS resources and TRPs/beams exists, and bit 0 indicates there is no mapping between PRS resources and TRPs/beams, etc.).

In response to the indication 1624, the UE 1602 may determine whether to utilize the mapping mechanism, such as for training its AI/ML positioning model. For example, based on the indication 1624, at 1644, the UE 1602 may transmit a request for the list of indices 1610, the mapping 1614, the updated mapping 1616, and/or the updated list of indices 1618, etc. Such configuration may conserve transmission resources as not all UEs may specify the mapping (e.g., UEs that do not need the mapping may skip sending the request 1620 and/or receiving mapping related information from the network entity 1604). Then, as described in connection with 1630, 1632, 1634, and/or 1640, the network entity 1604 may transmit, to or for the UE 1602, the list of indices 1610, the mapping 1614, the updated mapping 1616, and/or the updated list of indices 1618 based on the request 1620.

Aspects described above provide virtual mapping between anchor location/beams and positioning reference resources. A network (NW) can indicate, to the UE, a "virtual map" between PRS resources and TRP locations/beams that does not tell the exact TRP location/beam information and/or does not specify disclosing cells physical and global IDs. This enables the UE to decide how to map PRS measurements to its AI/ML model and/or update and switch the model (as applicable); the NW can maintain a "unique" indexing for Cells/sites/TRPs and their beams and indicate how PRS resources (i.e., PFL ID, Set IDs, PRS IDs) map to this indexing. Aspects described above provide several proposals directed to signaling, configurations, and protocols directed to the NW, UE, and location server (LMF) for the "virtual" mapping of anchor locations/beams and PRS resources, maintenance/update of the mapping, as well as training data collection for AI/ML positioning model.

Figure 17:
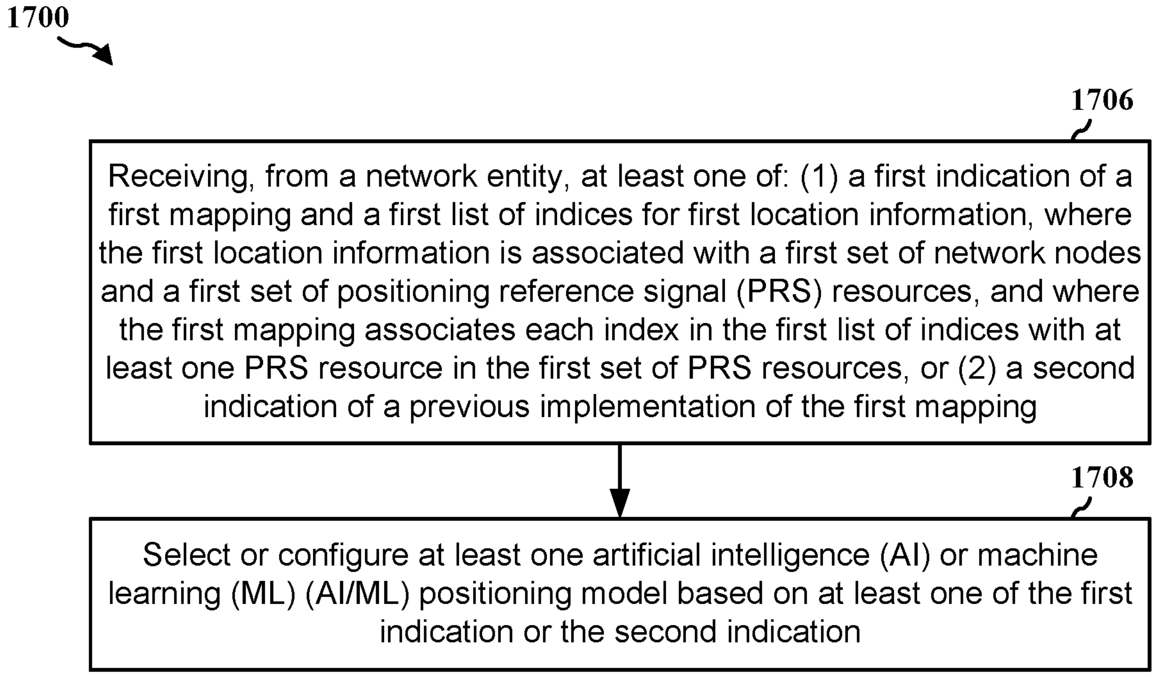
FIG. 17 is a flowchart of a method of wireless communication.

FIG. 17 is a flowchart 1700 of a method of wireless communication. The method may be performed by a UE (e.g., the UE 104, 404, 502, 1602; the apparatus 1904). The method may improve and maintain the accuracy and performance of AI/ML positioning by enabling the UE to be aware of changes in mapping between PRS resource(s) and TRP location(s)/beam angle(s) without specifying a network entity to disclose the locations and beam angle information of their TRPs, thereby enabling the network entity to maintain the privacy of their TRPs.

At 1706, the UE may receive, from a network entity, at least one of: (1) a first indication of a first mapping and a first list of indices for first location information, where the first location information is associated with a first set of network nodes and a first set of PRS resources, and where the first mapping associates each index in the first list of indices with at least one PRS resource in the first set of PRS resources, or (2) a second indication of a previous implementation of the first mapping, such as described in connection with FIG. 16. For example, at 1630, the UE 1602 may receive, from a network entity 1604, a list of indices 1610 that corresponds to location(s) and/or beam(s) of a set of network nodes 1606. At 1632, the UE 1602 may receive, from the network entity 1604, a list of PRS resources 1612, such as their corresponding PFL ID(s), PRS resource set ID(s), and/or PRS resources ID(s), etc. At 1634, the UE 1602 may receive, from the network entity 1604, a mapping 1614 that indicates how the list of indices 1610 maps to the list of PRS resources 1612. In some examples, as shown at 1650, the UE 1602 may receive, from the network entity 1604, an indication 1624 that indicates a mapping (e.g., the mapping 1614) has been set for associating PRS resources to location and beams of the set of network nodes 1606. The reception of the first indication and/or the second indication may be performed by, e.g., the mapping application component 198, the transceiver(s) 1922, the cellular baseband processor(s) 1924, and/or the application processor(s) 1906 of the apparatus 1904 in FIG. 19.

At 1708, the UE may select or configure at least one AI/ML positioning model based on at least one of the first indication or the second indication, such as described in connection with FIG. 16. For example, at 1648, the UE 1602 may select, decide, and/or configure a UE-sided AI/ML positioning model (e.g., the AI/ML positioning model 1608) based on the mapping 1614 (e.g., the first/initial mapping) and/or the updated mapping 1616 (e.g., the second/updated mapping). The selection or the configuration of the at least one AI/ML positioning model may be performed by, e.g., the mapping application component 198, the transceiver(s) 1922, the cellular baseband processor(s) 1924, and/or the application processor(s) 1906 of the apparatus 1904 in FIG. 19.

In one example, the UE may receive, from the network entity, a third indication of a second mapping that associates a second list of indices for second location information associated with a second set of network nodes and a second set of PRS resources, where the second set of network nodes is at least partially different from the first set of network nodes; and the UE may configure the at least one AI/ML positioning model based on the second mapping or selecting another AI/ML positioning model based on the second mapping, such as described in connection with FIG. 16. For example, at 1640, when there is a change or update to the mapping between the list of indices 1610 and the list of PRS resources 1612, the UE 1602 may receive, from the network entity 1604, an updated mapping 1616 that indicates the updates/changes to the mapping 1614. Then, at 1648, the UE 1602 may select, decide, and/or configure a UE-sided AI/ML positioning model (e.g., the AI/ML positioning model 1608) based on the updated mapping 1616. The reception of the third indication and/or the configuration of the at least one AI/ML positioning model may be performed by, e.g., the mapping application component 198, the transceiver(s) 1922, the cellular baseband processor(s) 1924, and/or the application processor(s) 1906 of the apparatus 1904 in FIG. 19.

In another example, the first location information may include a first set of locations and beams associated with the first set of network nodes, and where the second location information may include a second set of locations and beams associated with the second set of network nodes.

In another example, the UE may train the at least one AI/ML positioning model based on the first mapping or the second mapping.

In another example, the at least one AI/ML positioning model may be at least one UE-side AI/ML positioning model.

In another example, the network entity is a location server or an LMF, and the first set of nodes includes one or more TRPs, one or more cells, one or more sites, or a combination thereof.

In another example, the UE may receive, from the network entity, an updated list of indices for the first location information, where the updated list of indices is at least partially different from the first list of indices, such as described in connection with FIG. 16. For example, at 1642, when there is a change or update to the list of indices 1610, the UE 1602 may receive, from the network entity 1604, an updated list of indices 1618 that indicates the updates/changes to the list of indices 1610. The reception of the updated list of indices may be performed by, e.g., the mapping application component 198, the transceiver(s) 1922, the cellular baseband processor(s) 1924, and/or the application processor(s) 1906 of the apparatus 1904 in FIG. 19.

In another example, the UE may transmit, to the network entity, a request to provide at least one of: the first mapping, the first list of indices for the first location information, the second mapping, the second list of indices for the second location information, or an updated list of indices for the first location information, such as described in connection with FIG. 16. For example, at 1644, the UE 1602 may transmit a request for the list of indices 1610, the mapping 1614, the updated mapping 1616, and/or the updated list of indices 1618, etc. The transmission of the request may be performed by, e.g., the mapping application component 198, the transceiver(s) 1922, the cellular baseband processor(s) 1924, and/or the application processor(s) 1906 of the apparatus 1904 in FIG. 19.

In another example, the UE may receive, from the network entity, a configuration indicating at least one of a periodicity or a condition for the transmission of the request, such as described in connection with FIG. 16. For example, at 1646, the UE 1602 may receive, from the network entity 1604, configuration 1622 associated with the request 1620. The reception of the configuration may be performed by, e.g., the mapping application component 198, the transceiver(s) 1922, the cellular baseband processor(s) 1924, and/or the application processor(s) 1906 of the apparatus 1904 in FIG. 19.

In another example, the UE may receive, from the network entity in response to the second indication, a notification regarding an update or a change for the first mapping. In some implementations, the UE may transmit, to the network entity, a request to provide the notification regarding the update or the change for the first mapping, where the notification is received based on the request. In some implementations, the UE may receive, from the network entity, a configuration indicating at least one of a periodicity or a condition for the transmission of the request. In some implementations, the UE may configure the at least one AI/ML positioning model based on the notification, or select another AI/ML positioning model based on the notification.

Figure 18:
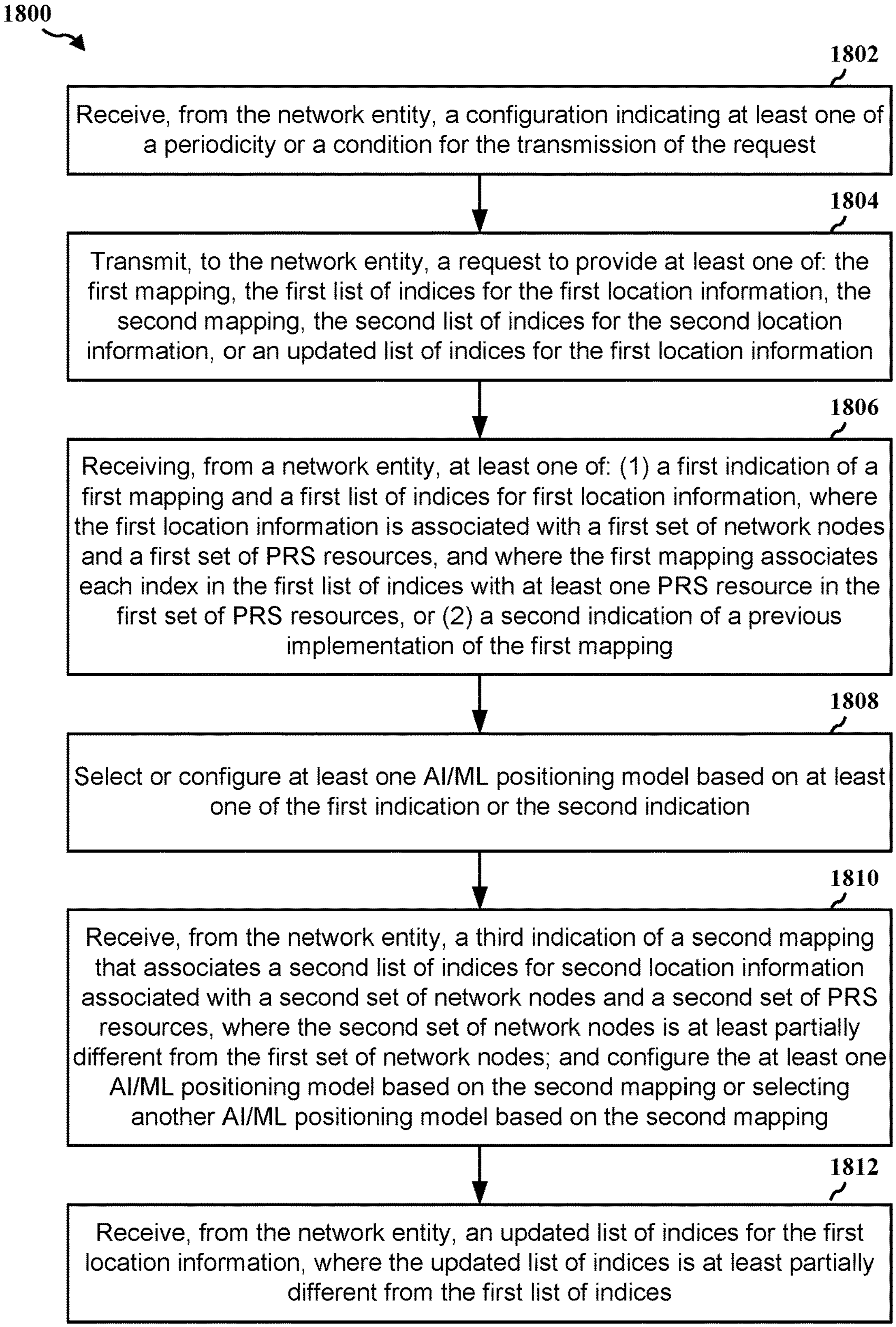
FIG. 18 is a flowchart of a method of wireless communication.

FIG. 18 is a flowchart 1800 of a method of wireless communication. The method may be performed by a UE (e.g., the UE 104, 404, 502, 1602; the apparatus 1904). The method may improve and maintain the accuracy and performance of AI/ML positioning by enabling the UE to be aware of changes in mapping between PRS resource(s) and TRP location(s)/beam angle(s) without specifying a network entity to disclose the locations and beam angle information of their TRPs, thereby enabling the network entity to maintain the privacy of their TRPs.

At 1806, the UE may receive, from a network entity, at least one of: (1) a first indication of a first mapping and a first list of indices for first location information, where the first location information is associated with a first set of network nodes and a first set of PRS resources, and where the first mapping associates each index in the first list of indices with at least one PRS resource in the first set of PRS resources, or (2) a second indication of a previous implementation of the first mapping, such as described in connection with FIG. 16. For example, at 1630, the UE 1602 may receive, from a network entity 1604, a list of indices 1610 that corresponds to location(s) and/or beam(s) of a set of network nodes 1606. At 1632, the UE 1602 may receive, from the network entity 1604, a list of PRS resources 1612, such as their corresponding PFL ID(s), PRS resource set ID(s), and/or PRS resources ID(s), etc. At 1634, the UE 1602 may receive, from the network entity 1604, a mapping 1614 that indicates how the list of indices 1610 maps to the list of PRS resources 1612. In some examples, as shown at 1650, the UE 1602 may receive, from the network entity 1604, an indication 1624 that indicates a mapping (e.g., the mapping 1614) has been set for associating PRS resources to location and beams of the set of network nodes 1606. The reception of the first indication and/or the second indication may be performed by, e.g., the mapping application component 198, the transceiver(s) 1922, the cellular baseband processor(s) 1924, and/or the application processor(s) 1906 of the apparatus 1904 in FIG. 19.

At 1808, the UE may select or configure at least one AI/ML positioning model based on at least one of the first indication or the second indication, such as described in connection with FIG. 16. For example, at 1648, the UE 1602 may select, decide, and/or configure a UE-sided AI/ML positioning model (e.g., the AI/ML positioning model 1608) based on the mapping 1614 (e.g., the first/initial mapping) and/or the updated mapping 1616 (e.g., the second/updated mapping). The selection or the configuration of the at least one AI/ML positioning model may be performed by, e.g., the mapping application component 198, the transceiver(s) 1922, the cellular baseband processor(s) 1924, and/or the application processor(s) 1906 of the apparatus 1904 in FIG. 19.

At 1810, the UE may receive, from the network entity, a third indication of a second mapping that associates a second list of indices for second location information associated with a second set of network nodes and a second set of PRS resources, where the second set of network nodes is at least partially different from the first set of network nodes; and the UE may configure the at least one AI/ML positioning model based on the second mapping or selecting another AI/ML positioning model based on the second mapping, such as described in connection with FIG. 16. For example, at 1640, when there is a change or update to the mapping between the list of indices 1610 and the list of PRS resources 1612, the UE 1602 may receive, from the network entity 1604, an updated mapping 1616 that indicates the updates/changes to the mapping 1614. Then, at 1648, the UE 1602 may select, decide, and/or configure a UE-sided AI/ML positioning model (e.g., the AI/ML positioning model 1608) based on the updated mapping 1616. The reception of the third indication and/or the configuration of the at least one AI/ML positioning model may be performed by, e.g., the mapping application component 198, the transceiver(s) 1922, the cellular baseband processor(s) 1924, and/or the application processor(s) 1906 of the apparatus 1904 in FIG. 19.

In one example, the first location information may include a first set of locations and beams associated with the first set of network nodes, and where the second location information may include a second set of locations and beams associated with the second set of network nodes.

In another example, the UE may train the at least one AI/ML positioning model based on the first mapping or the second mapping.

In another example, the at least one AI/ML positioning model may be at least one UE-side AI/ML positioning model.

In another example, the network entity is a location server or an LMF, and the first set of nodes includes one or more TRPs, one or more cells, one or more sites, or a combination thereof.

At 1812, the UE may receive, from the network entity, an updated list of indices for the first location information, where the updated list of indices is at least partially different from the first list of indices, such as described in connection with FIG. 16. For example, at 1642, when there is a change or update to the list of indices 1610, the UE 1602 may receive, from the network entity 1604, an updated list of indices 1618 that indicates the updates/changes to the list of indices 1610. The reception of the updated list of indices may be performed by, e.g., the mapping application component 198, the transceiver(s) 1922, the cellular baseband processor(s) 1924, and/or the application processor(s) 1906 of the apparatus 1904 in FIG. 19.

In one example, as shown at 1804, the UE may transmit, to the network entity, a request to provide at least one of: the first mapping, the first list of indices for the first location information, the second mapping, the second list of indices for the second location information, or an updated list of indices for the first location information, such as described in connection with FIG. 16. For example, at 1644, the UE 1602 may transmit a request for the list of indices 1610, the mapping 1614, the updated mapping 1616, and/or the updated list of indices 1618, etc. The transmission of the request may be performed by, e.g., the mapping application component 198, the transceiver(s) 1922, the cellular baseband processor(s) 1924, and/or the application processor(s) 1906 of the apparatus 1904 in FIG. 19.

In another example, as shown at 1802, the UE may receive, from the network entity, a configuration indicating at least one of a periodicity or a condition for the transmission of the request, such as described in connection with FIG. 16. For example, at 1646, the UE 1602 may receive, from the network entity 1604, configuration 1622 associated with the request 1620. The reception of the configuration may be performed by, e.g., the mapping application component 198, the transceiver(s) 1922, the cellular baseband processor(s) 1924, and/or the application processor(s) 1906 of the apparatus 1904 in FIG. 19.

In another example, the UE may receive, from the network entity in response to the second indication, a notification regarding an update or a change for the first mapping. In some implementations, the UE may transmit, to the network entity, a request to provide the notification regarding the update or the change for the first mapping, where the notification is received based on the request. In some implementations, the UE may receive, from the network entity, a configuration indicating at least one of a periodicity or a condition for the transmission of the request. In some implementations, the UE may configure the at least one AI/ML positioning model based on the notification, or select another AI/ML positioning model based on the notification.

Figure 19:
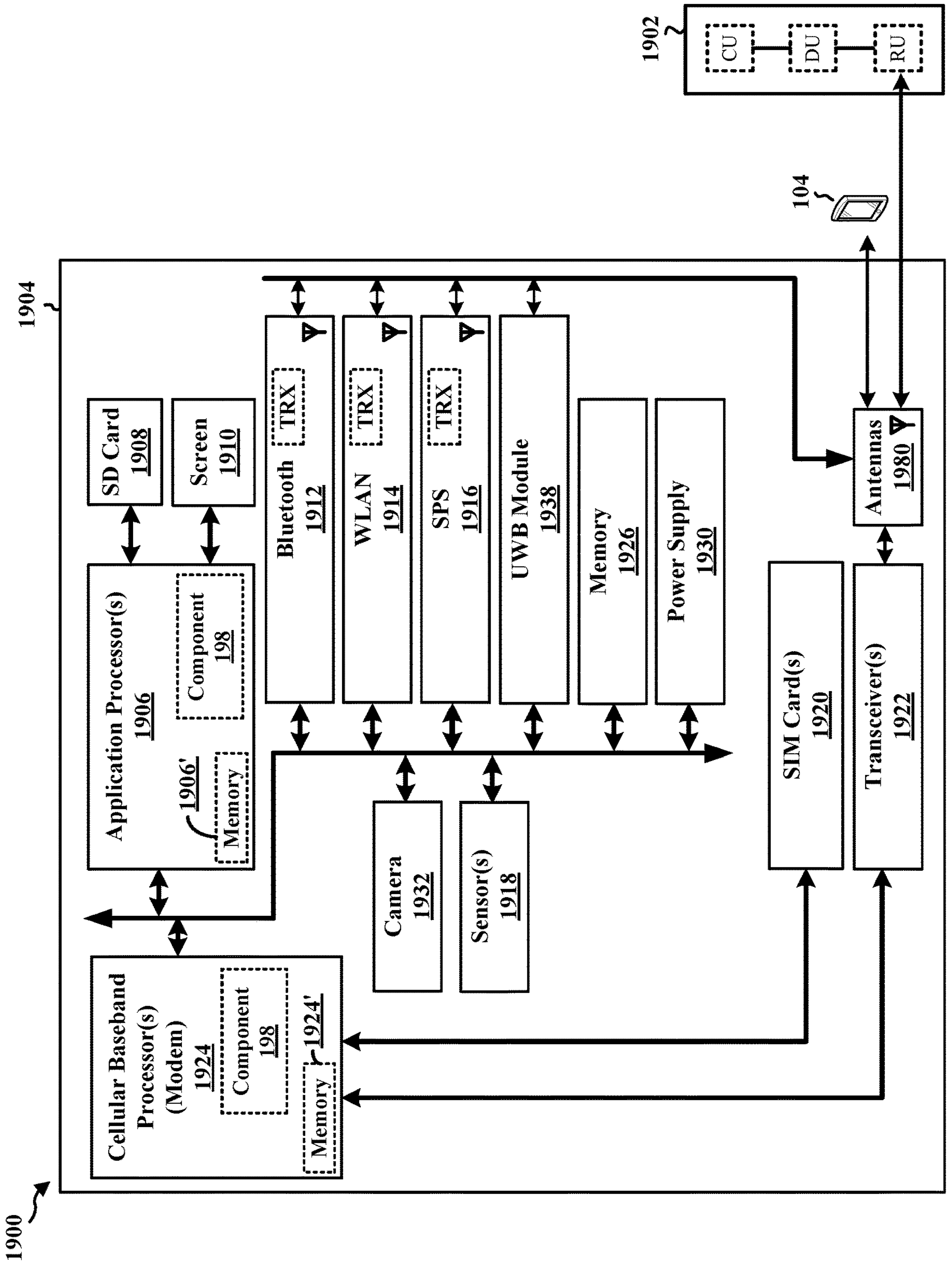
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include at least one cellular baseband processor 1924 (also referred to as a modem) coupled to one or more transceivers 1922 (e.g., cellular RF transceiver). The cellular baseband processor(s) 1924 may include at least one on-chip memory 1924'. In some aspects, the apparatus 1904 may further include one or more subscriber identity modules (SIM) cards 1920 and at least one application processor 1906 coupled to a secure digital (SD) card 1908 and a screen 1910. The application processor(s) 1906 may include on-chip memory 1906'. In some aspects, the apparatus 1904 may further include a Bluetooth module 1912, a WLAN module 1914, an ultrawideband (UWB) module 1938, an SPS module 1916 (e.g., GNSS module), one or more sensor modules 1918 (e.g., barometric pressure sensor/altimeter; ultrawide band (UWB) sensor, motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, the UWB module 1938, and the SPS module 1916 may include an on-chip transceiver (TRX) (or in some cases, just a receiver (RX)). The Bluetooth module 1912, the WLAN module 1914, the UWB module 1938, and the SPS module 1916 may include their own dedicated antennas and/or utilize the antennas 1980 for communication. The cellular baseband processor(s) 1924 communicates through the transceiver(s) 1922 via one or more antennas 1980 with the UE 104 and/or with an RU associated with a network entity 1902. The cellular baseband processor(s) 1924 and the application processor(s) 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor(s) 1924 and the application processor(s) 1906 are each responsible for general processing, including the execution of software stored on the computer-readable medium/memory. The software, when executed by the cellular baseband processor(s) 1924/application processor(s) 1906, causes the cellular baseband processor(s) 1924/application processor(s) 1906 to perform the various functions described supra. The computer-readable medium/memory may also be used for storing data that is manipulated by the cellular baseband processor(s) 1924/application processor(s) 1906 when executing software. The cellular baseband processor(s) 1924/application processor(s) 1906 may be a component of the UE 350 and may include the at least one memory 360 and/or at least one of the TX processor 368, the RX processor 356, and the controller/processor 359. In one configuration, the apparatus 1904 may be at least one processor chip (modem and/or application) and include just the cellular baseband processor(s) 1924 and/or the application processor(s) 1906, and in another configuration, the apparatus 1904 may be the entire UE (e.g., see UE 350 of FIG. 3) and include the additional modules of the apparatus 1904.

As discussed supra, the mapping application component 198 may be configured to receive, from a network entity, at least one of: (1) a first indication of a first mapping and a first list of indices for first location information, where the first location information is associated with a first set of network nodes and a first set of PRS resources and where the first mapping associates each index in the first list of indices with at least one PRS resource in the first set of PRS resources, or (2) a second indication of a previous implementation of the first mapping. The mapping application component 198 may also be configured to select or configure at least one AI/ML positioning model based on at least one of the first indication or the second indication. The mapping application component 198 may be within the cellular baseband processor(s) 1924, the application processor(s) 1906, or both the cellular baseband processor(s) 1924 and the application processor(s) 1906. The mapping application component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1904 may include a variety of components configured for various functions. In one configuration, the apparatus 1904, and in particular the cellular baseband processor(s) 1924 and/or the application processor(s) 1906, may include means for receiving, from a network entity, at least one of: (1) a first indication of a first mapping and a first list of indices for first location information, where the first location information is associated with a first set of network nodes and a first set of PRS resources and where the first mapping associates each index in the first list of indices with at least one PRS resource in the first set of PRS resources, or (2) a second indication of a previous implementation of the first mapping. The apparatus 1904 may further include means for selecting or means for configuring at least one AI/ML positioning model based on at least one of the first indication or the second indication.

In one configuration, the apparatus 1904 may further include means for receiving, from the network entity, a third indication of a second mapping that associates a second list of indices for second location information associated with a second set of network nodes and a second set of PRS resources, where the second set of network nodes is at least partially different from the first set of network nodes; and means for configuring the at least one AI/ML positioning model based on the second mapping or selecting another AI/ML positioning model based on the second mapping.

In another configuration, the first location information may include a first set of locations and beams associated with the first set of network nodes, and where the second location information may include a second set of locations and beams associated with the second set of network nodes.

In another configuration, the apparatus 1904 may further include means for training the at least one AI/ML positioning model based on the first mapping or the second mapping.

In another configuration, the at least one AI/ML positioning model may be at least one UE-side AI/ML positioning model.

In another configuration, the network entity is a location server or an LMF, and the first set of nodes includes one or more TRPs, one or more cells, one or more sites, or a combination thereof.

In another configuration, the apparatus 1904 may further include means for receiving, from the network entity, an updated list of indices for the first location information, where the updated list of indices is at least partially different from the first list of indices.

In another configuration, the apparatus 1904 may further include means for transmitting, to the network entity, a request to provide at least one of: the first mapping, the first list of indices for the first location information, the second mapping, the second list of indices for the second location information, or an updated list of indices for the first location information.

In another configuration, the apparatus 1904 may further include means for receiving, from the network entity, a configuration indicating at least one of a periodicity or a condition for the transmission of the request.

In another configuration, the apparatus 1904 may further include means for receiving, from the network entity in response to the second indication, a notification regarding an update or a change for the first mapping. In some implementations, the apparatus 1904 may further include means for transmitting, to the network entity, a request to provide the notification regarding the update or the change for the first mapping, where the notification is received based on the request. In some implementations, the apparatus 1904 may further include means for receiving, from the network entity, a configuration indicating at least one of a periodicity or a condition for the transmission of the request. In some implementations, the apparatus 1904 may further include means for configuring the at least one AI/ML positioning model based on the notification, or select another AI/ML positioning model based on the notification.

The means may be the mapping application component 198 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 20:
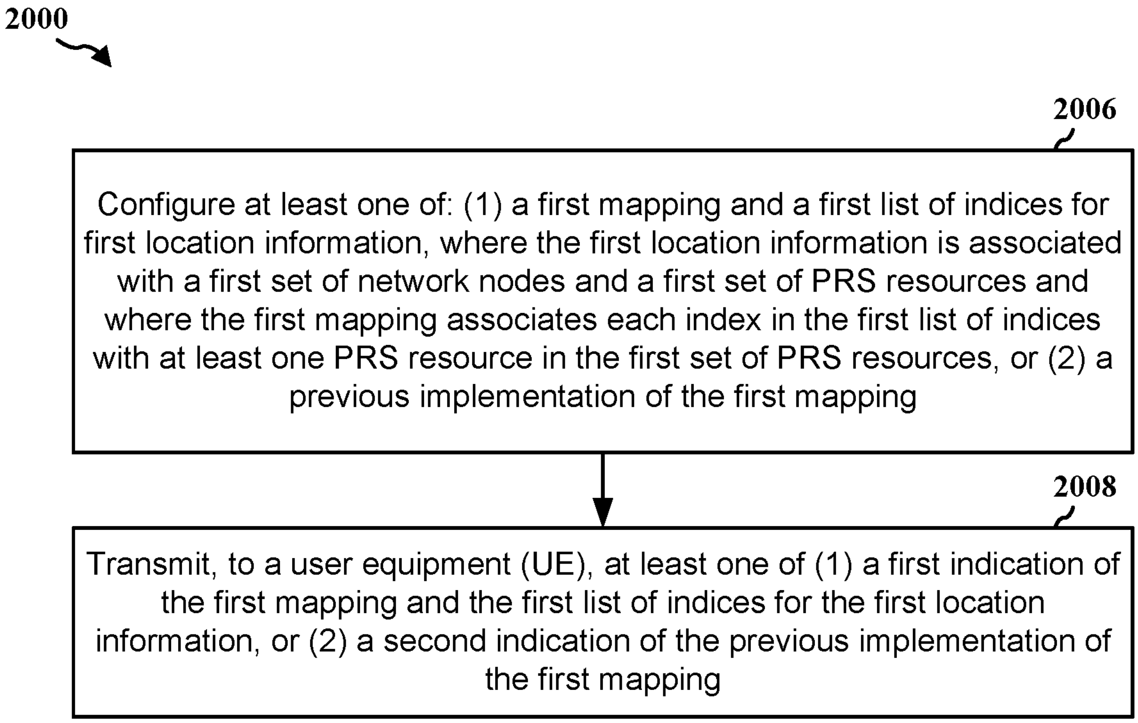
FIG. 20 is a flowchart of a method of wireless communication.

FIG. 20 is a flowchart 2000 of a method of wireless communication. The method may be performed by a network entity (e.g., the one or more location servers 168; the location server 504; the network entity 1604, 2260). The method may enable the network entity to indicate, to or for a UE, a mapping (which may also be referred to as a "virtual map" or "virtual mapping") between PRS resources and TRP locations/beam information that does not disclose the actual/exact TRP locations/beam information, and/or does not specify disclosure of cells physical and global IDs, etc.

At 2006, the network entity may configure at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping, such as described in connection with FIG. 16. For example, at 1630, the network entity 1604 may configure a list of indices 1610 that corresponds to location(s) and/or beam(s) of a set of network nodes 1606. At 1632, the network entity 1604 may configure a list of PRS resources 1612 for the UE 1602. At 1634, the network entity 1604 may configure a mapping 1614 that indicates how the list of indices 1610 maps to the list of PRS resources 1612. In some examples, as shown at 1650, the network entity 1604 may configure an indication 1624 that indicates a mapping (e.g., the mapping 1614, or a previous implementation (existence) of the mapping 1614) has been set for associating PRS resources to location and beams of the set of network nodes 1606. The configuration of the first mapping and the first list of indices and/or the configuration of the previous implementation of the first mapping may be performed by, e.g., the mapping indication component 197, the network processor(s) 2212, and/or the network interface 2280 of the network entity 2260 in FIG. 22.

In one example, the network entity is a location server or an LMF, and where the first set of nodes includes one or more TRPs, one or more cells, one or more sites, or a combination thereof.

At 2008, the network entity may transmit, to a UE, at least one of (1) a first indication of the first mapping and the first list of indices for the first location information, or (2) a second indication of the previous implementation of the first mapping, such as described in connection with FIG. 16. For example, at 1630, the network entity 1604 may transmit, to or for the UE 1602, the list of indices 1610 that corresponds to location(s) and/or beam(s) of a set of network nodes 1606. At 1632, the network entity 1604 may transmit, to or for the UE 1602, the list of PRS resources 1612. At 1634, the network entity 1604 may transmit, to or for the UE 1602, the mapping 1614 that indicates how the list of indices 1610 maps to the list of PRS resources 1612. In some examples, as shown at 1650, the network entity 1604 may transmit, to or for the UE 1602, an indication 1624 that indicates a mapping (e.g., the mapping 1614, or a previous implementation (existence) of the mapping 1614) has been set for associating PRS resources to location and beams of the set of network nodes 1606. The transmission of the first indication and/or the second indication may be performed by, e.g., the mapping indication component 197, the network processor(s) 2212, and/or the network interface 2280 of the network entity 2260 in FIG. 22.

In one example, the network entity may transmit, to the UE, a third indication of a second mapping that associates a second list of indices for second location information associated with a second set of network nodes and a second set of PRS resources, where the second set of network nodes is at least partially different from the first set of network nodes, such as described in connection with FIG. 16. For example, at 1640, when there is a change or update to the mapping between the list of indices 1610 and the list of PRS resources 1612, the network entity 1604 may transmit, to and for the UE 1602, an updated mapping 1616 that indicates the updates/changes to the mapping 1614. The transmission of the third indication may be performed by, e.g., the mapping indication component 197, the network processor(s) 2212, and/or the network interface 2280 of the network entity 2260 in FIG. 22.

In another example, the network entity may transmit, to the UE, an updated list of indices for the first location information, where the updated list of indices is at least partially different from the first list of indices, such as described in connection with FIG. 16. For example, at 1642, when there is a change or update to the list of indices 1610, the network entity 1604 may transmit, to and for the UE 1602, an updated list of indices 1618 that indicates the updates/changes to the list of indices 1610. The transmission of the updated list of indices may be performed by, e.g., the mapping indication component 197, the network processor(s) 2212, and/or the network interface 2280 of the network entity 2260 in FIG. 22.

In another example, the network entity may receive, from the UE, a request to provide at least one of: the first mapping, the first list of indices for the first location information, the second mapping, the second list of indices for the second location information, or an updated list of indices for the first location information, such as described in connection with FIG. 16. For example, at 1644, the network entity 1604 may receive, from the UE 1602, a request for at least one of the list of indices 1610, the mapping 1614, the updated mapping 1616, and/or the updated list of indices 1618. The reception of the request may be performed by, e.g., the mapping indication component 197, the network processor(s) 2212, and/or the network interface 2280 of the network entity 2260 in FIG. 22.

In another example, the network entity may transmit, to the UE, a configuration indicating at least one of a periodicity or a condition for a transmission of the request, such as described in connection with FIG. 16. For example, at 1646, the network entity 1604 may transmit, to or for the UE 1602, a configuration 1622 associated with the request 1620. The transmission of the configuration may be performed by, e.g., the mapping indication component 197, the network processor(s) 2212, and/or the network interface 2280 of the network entity 2260 in FIG. 22.

In another example, the network entity may transmit, to the UE based on the second indication, a notification regarding an update or a change for the first mapping. In some implementations, the network entity may receive, from the UE, a request to provide the notification regarding the update or the change for the first mapping, where the notification is transmitted based on the request. In some implementations, the network entity may transmit, to the UE, a configuration indicating at least one of a periodicity or a condition for a transmission of the request.

Figure 21:
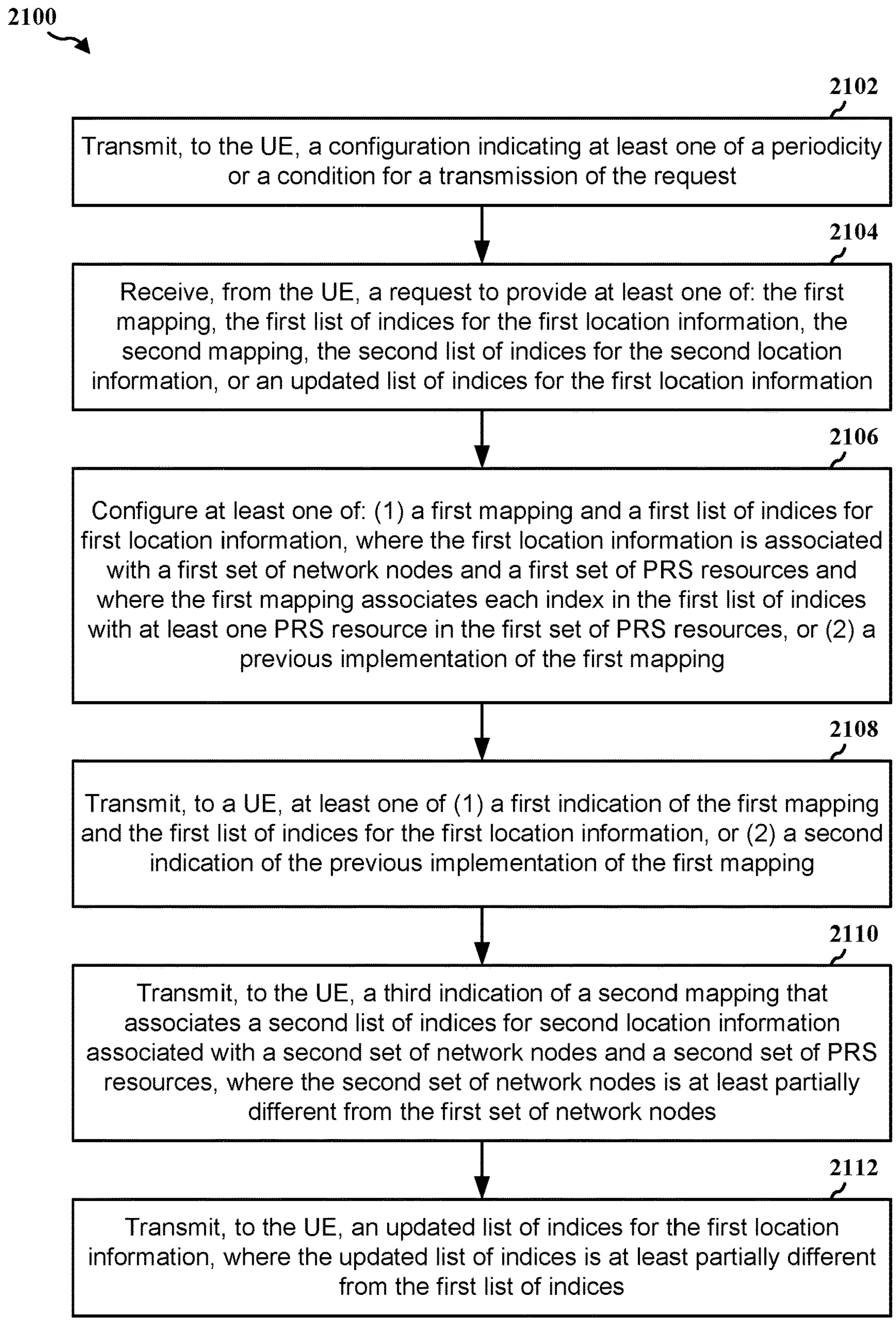
FIG. 21 is a flowchart of a method of wireless communication.

FIG. 21 is a flowchart 2100 of a method of wireless communication. The method may be performed by a network entity (e.g., the one or more location servers 168; the location server 504; the network entity 1604, 2260). The method may enable the network entity to indicate, to or for a UE, a mapping (which may also be referred to as a “virtual map” or “virtual mapping”) between PRS resources and TRP locations/beam information that does not disclose the actual/exact TRP locations/beam information, and/or does not specify disclosure of cells physical and global IDs, etc.

At 2106, the network entity may configure at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping, such as described in connection with FIG. 16. For example, at 1630, the network entity 1604 may configure a list of indices 1610 that corresponds to location(s) and/or beam(s) of a set of network nodes 1606. At 1632, the network entity 1604 may configure a list of PRS resources 1612 for the UE 1602. At 1634, the network entity 1604 may configure a mapping 1614 that indicates how the list of indices 1610 maps to the list of PRS resources 1612. In some examples, as shown at 1650, the network entity 1604 may configure an indication 1624 that indicates a mapping (e.g., the mapping 1614, or a previous implementation (existence) of the mapping 1614) has been set for associating PRS resources to location and beams of the set of network nodes 1606. The configuration of the first mapping and the first list of indices and/or the configuration of the previous implementation of the first mapping may be performed by, e.g., the mapping indication component 197, the network processor(s) 2212, and/or the network interface 2280 of the network entity 2260 in FIG. 22.

In one example, the network entity is a location server or an LMF, and where the first set of nodes includes one or more TRPs, one or more cells, one or more sites, or a combination thereof.

At 2108, the network entity may transmit, to a UE, at least one of (1) a first indication of the first mapping and the first list of indices for the first location information, or (2) a second indication of the previous implementation of the first mapping, such as described in connection with FIG. 16. For example, at 1630, the network entity 1604 may transmit, to or for the UE 1602, the list of indices 1610 that corresponds to location(s) and/or beam(s) of a set of network nodes 1606. At 1632, the network entity 1604 may transmit, to or for the UE 1602, the list of PRS resources 1612. At 1634, the network entity 1604 may transmit, to or for the UE 1602, the mapping 1614 that indicates how the list of indices 1610 maps to the list of PRS resources 1612. In some examples, as shown at 1650, the network entity 1604 may transmit, to or for the UE 1602, an indication 1624 that indicates a mapping (e.g., the mapping 1614, or a previous implementation (existence) of the mapping 1614) has been set for associating PRS resources to location and beams of the set of network nodes 1606. The transmission of the first indication and/or the second indication may be performed by, e.g., the mapping indication component 197, the network processor(s) 2212, and/or the network interface 2280 of the network entity 2260 in FIG. 22.

At 2110, the network entity may transmit, to the UE, a third indication of a second mapping that associates a second list of indices for second location information associated with a second set of network nodes and a second set of PRS resources, where the second set of network nodes is at least partially different from the first set of network nodes, such as described in connection with FIG. 16. For example, at 1640, when there is a change or update to the mapping between the list of indices 1610 and the list of PRS resources 1612, the network entity 1604 may transmit, to and for the UE 1602, an updated mapping 1616 that indicates the updates/changes to the mapping 1614. The transmission of the third indication may be performed by, e.g., the mapping indication component 197, the network processor(s) 2212, and/or the network interface 2280 of the network entity 2260 in FIG. 22.

At 2112, the network entity may transmit, to the UE, an updated list of indices for the first location information, where the updated list of indices is at least partially different from the first list of indices, such as described in connection with FIG. 16. For example, at 1642, when there is a change or update to the list of indices 1610, the network entity 1604 may transmit, to and for the UE 1602, an updated list of indices 1618 that indicates the updates/changes to the list of indices 1610. The transmission of the updated list of indices may be performed by, e.g., the mapping indication component 197, the network processor(s) 2212, and/or the network interface 2280 of the network entity 2260 in FIG. 22.

In one example, as shown at 2104, the network entity may receive, from the UE, a request to provide at least one of: the first mapping, the first list of indices for the first location information, the second mapping, the second list of indices for the second location information, or an updated list of indices for the first location information, such as described in connection with FIG. 16. For example, at 1644, the network entity 1604 may receive, from the UE 1602, a request for at least one of the list of indices 1610, the mapping 1614, the updated mapping 1616, and/or the updated list of indices 1618. The reception of the request may be performed by, e.g., the mapping indication component 197, the network processor(s) 2212, and/or the network interface 2280 of the network entity 2260 in FIG. 22.

In another example, as shown at 2102, the network entity may transmit, to the UE, a configuration indicating at least one of a periodicity or a condition for a transmission of the request, such as described in connection with FIG. 16. For example, at 1646, the network entity 1604 may transmit, to or for the UE 1602, a configuration 1622 associated with the request 1620. The transmission of the configuration may be performed by, e.g., the mapping indication component 197, the network processor(s) 2212, and/or the network interface 2280 of the network entity 2260 in FIG. 22.

In one example, the network entity may transmit, to the UE based on the second indication, a notification regarding an update or a change for the first mapping. In some implementations, the network entity may receive, from the UE, a request to provide the notification regarding the update or the change for the first mapping, where the notification is transmitted based on the request. In some implementations, the network entity may transmit, to the UE, a configuration indicating at least one of a periodicity or a condition for a transmission of the request.

Figure 22:
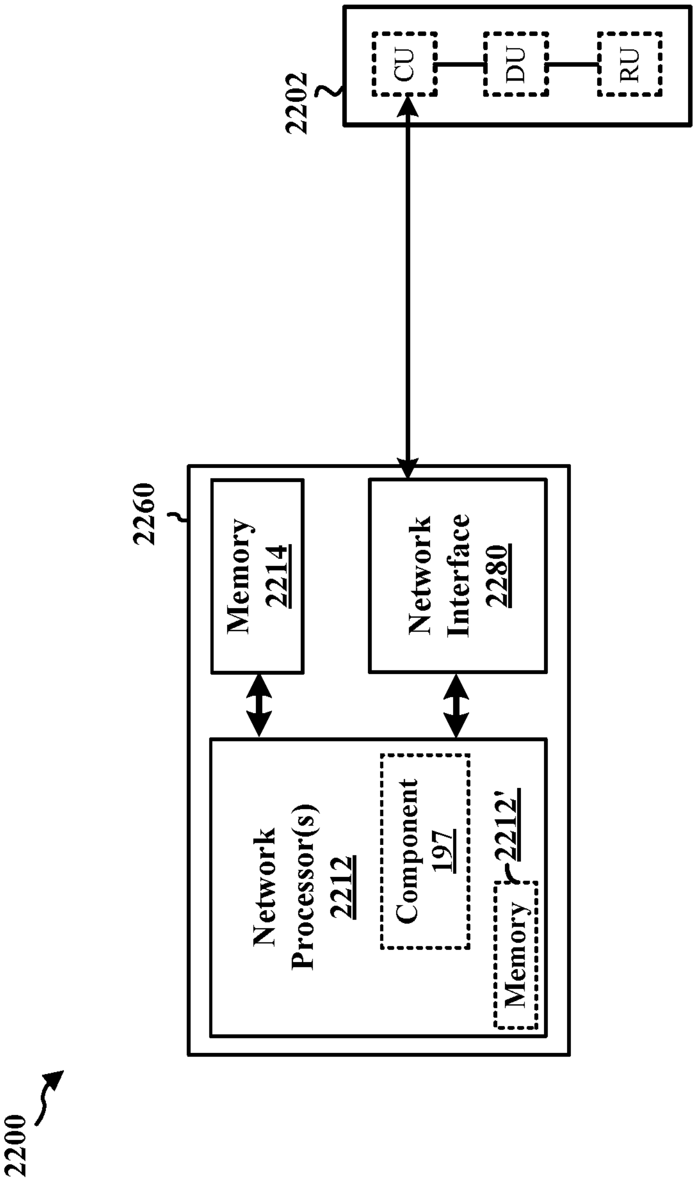
FIG. 22 is a diagram illustrating an example of a hardware implementation for an example network entity.

FIG. 22 is a diagram 2200 illustrating an example of a hardware implementation for a network entity 2260. In one example, the network entity 2260 may be within the core network 120. The network entity 2260 may include at least one network processor 2212. The network processor(s) 2212 may include on-chip memory 2212'. In some aspects, the network entity 2260 may further include additional memory modules 2214. The network entity 2260 communicates via the network interface 2280 directly (e.g., backhaul link) or indirectly (e.g., through a RIC) with the CU 2202. The on-chip memory 2212' and the additional memory modules 2214 may each be considered a computer-readable medium/memory. Each computer-readable medium/memory may be non-transitory. The network processor(s) 2212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the mapping indication component 197 may be configured to configure at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping. The mapping indication component 197 may also be configured to transmit, to a UE, at least one of (1) a first indication of the first mapping and the first list of indices for the first location information, or (2) a second indication of the previous implementation of the first mapping. The mapping indication component 197 may be within the network processor(s) 2212. The mapping indication component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2260 may include a variety of components configured for various functions. In one configuration, the network entity 2260 may include means for configuring at least one of: (1) a first mapping and a first list of indices for first location information, where the first location information is associated with a first set of network nodes and a first set of PRS resources and where the first mapping associates each index in the first list of indices with at least one PRS resource in the first set of PRS resources, or (2) a previous implementation of the first mapping. The network entity 2260 may further include means for transmitting, to a UE, at least one of (1) a first indication of the first mapping and the first list of indices for the first location information, or (2) a second indication of the previous implementation of the first mapping.

In one configuration, the network entity is a location server or an LMF, and where the first set of nodes includes one or more TRPs, one or more cells, one or more sites, or a combination thereof.

In another configuration, the network entity 2260 may further include means for transmitting, to the UE, a third indication of a second mapping that associates a second list of indices for second location information associated with a second set of network nodes and a second set of PRS resources, where the second set of network nodes is at least partially different from the first set of network nodes.

In another configuration, the network entity 2260 may further include means for transmitting, to the UE, an updated list of indices for the first location information, where the updated list of indices is at least partially different from the first list of indices.

In another configuration, the network entity 2260 may further include means for receiving, from the UE, a request to provide at least one of: the first mapping, the first list of indices for the first location information, the second mapping, the second list of indices for the second location information, or an updated list of indices for the first location information.

In another configuration, the network entity 2260 may further include means for transmitting, to the UE, a configuration indicating at least one of a periodicity or a condition for a transmission of the request.

In another configuration, the network entity 2260 may further include means for transmitting, to the UE based on the second indication, a notification regarding an update or a change for the first mapping. In some implementations, the network entity 2260 may further include means for receiving, from the UE, a request to provide the notification regarding the update or the change for the first mapping, where the notification is transmitted based on the request. In some implementations, the network entity 2260 may further include means for transmitting, to the UE, a configuration indicating at least one of a periodicity or a condition for a transmission of the request.

The means may be the mapping indication component 197 of the network entity 2260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving, from a network entity, at least one of: (1) a first indication of a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a second indication of a previous implementation of the first mapping; and selecting or configuring at least one artificial intelligence (AI) or machine learning (ML)(AI/ML) positioning model based on at least one of the first indication or the second indication.

Aspect 2 is the method of aspect 1, further comprising: receiving, from the network entity, a third indication of a second mapping that associates a second list of indices for second location information associated with a second set of network nodes and a second set of PRS resources, wherein the second set of network nodes is at least partially different from the first set of network nodes; and configuring the at least one AI/ML positioning model based on the second mapping or selecting another AI/ML positioning model based on the second mapping.

Aspect 3 is the method of aspect 1 or aspect 2, wherein the first location information includes a first set of locations and beams associated with the first set of network nodes, and wherein the second location information includes a second set of locations and beams associated with the second set of network nodes.

Aspect 4 is the method of any of aspects 1 to 3, further comprising: receiving, from the network entity, an updated list of indices for the first location information, wherein the updated list of indices is at least partially different from the first list of indices.

Aspect 5 is the method of any of aspects 1 to 4, further comprising: transmitting, to the network entity, a request to provide at least one of: the first mapping, the first list of indices for the first location information, the second mapping, the second list of indices for the second location information, or an updated list of indices for the first location information.

Aspect 6 is the method of any of aspects 1 to 5, further comprising: receiving, from the network entity, a configuration indicating at least one of a periodicity or a condition for the transmission of the request.

Aspect 7 is the method of any of aspects 1 to 6, further comprising: training the at least one AI/ML positioning model based on the first mapping or the second mapping.

Aspect 8 is the method of any of aspects 1 to 7, wherein the at least one AI/ML positioning model is at least one UE-side AI/ML positioning model.

Aspect 9 is the method of any of aspects 1 to 8, further comprising: receiving, from the network entity in response to the second indication, a notification regarding an update or a change for the first mapping.

Aspect 10 is the method of any of aspects 1 to 9, further comprising: transmitting, to the network entity, a request to provide the notification regarding the update or the change for the first mapping, wherein the notification is received based on the request.

Aspect 11 is the method of any of aspects 1 to 10, further comprising: receiving, from the network entity, a configuration indicating at least one of a periodicity or a condition for the transmission of the request.

Aspect 12 is the method of any of aspects 1 to 11, further comprising: configuring the at least one AI/ML positioning model based on the notification, or selecting another AI/ML positioning model based on the notification.

Aspect 13 is the method of any of aspects 1 to 12, wherein the network entity is a location server or a location management function (LMF), and wherein the first set of nodes includes one or more transmission reception points (TRPs), one or more cells, one or more sites, or a combination thereof.

Aspect 14 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a network entity, comprising: configuring at least one of: (1) a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a previous implementation of the first mapping; and transmitting, to a user equipment (UE), at least one of (1) a first indication of the first mapping and the first list of indices for the first location information, or (2) a second indication of the previous implementation of the first mapping.

Aspect 19 is the method of aspect 18, further comprising: transmitting, to the UE, a third indication of a second mapping that associates a second list of indices for second location information associated with a second set of network nodes and a second set of PRS resources, wherein the second set of network nodes is at least partially different from the first set of network nodes.

Aspect 20 is the method of aspect 18 or aspect 19, wherein the first location information includes a first set of locations and beams associated with the first set of network nodes, and wherein the second location information includes a second set of locations and beams associated with the second set of network nodes.

Aspect 21 is the method of any of aspects 18 to 20, further comprising: transmitting, to the UE, an updated list of indices for the first location information, wherein the updated list of indices is at least partially different from the first list of indices.

Aspect 22 is the method of any of aspects 18 to 21, further comprising: receiving, from the UE, a request to provide at least one of: the first mapping, the first list of indices for the first location information, the second mapping, the second list of indices for the second location information, or an updated list of indices for the first location information.

Aspect 23 is the method of any of aspects 18 to 22, further comprising: transmitting, to the UE, a configuration indicating at least one of a periodicity or a condition for a transmission of the request.

Aspect 24 is the method of any of aspects 18 to 23, further comprising: transmitting, to the UE based on the second indication, a notification regarding an update or a change for the first mapping.

Aspect 25 is the method of any of aspects 18 to 24, further comprising: receiving, from the UE, a request to provide the notification regarding the update or the change for the first mapping, wherein the notification is transmitted based on the request.

Aspect 26 is the method of any of aspects 18 to 25, further comprising: transmitting, to the UE, a configuration indicating at least one of a periodicity or a condition for a transmission of the request.

Aspect 27 is the method of any of aspects 18 to 26, wherein the network entity is a location server or a location management function (LMF), and wherein the first set of nodes includes one or more transmission reception points (TRPs), one or more cells, one or more sites, or a combination thereof.

Aspect 28 is an apparatus for wireless communication at a network entity, including: at least one memory; and at least one processor coupled to the at least one memory and, based at least in part on information stored in the at least one memory, the at least one processor, individually or in any combination, is configured to implement any of aspects 18 to 27.

Aspect 29 is the apparatus of aspect 28, further including at least one of a transceiver or an antenna coupled to the at least one processor.

Aspect 30 is an apparatus for wireless communication including means for implementing any of aspects 18 to 27.

Aspect 31 is a computer-readable medium (e.g., a non-transitory computer-readable medium) storing computer executable code, where the code when executed by a processor causes the processor to implement any of aspects 18 to 27.

What is claimed is:

1. An apparatus for wireless communication at a user equipment (UE), comprising:

at least one transceiver;

at least one memory; and at least one processor coupled to the at least one memory and the at least one transceiver, the at least one processor, individually or in any combination, is configured to:

receive, via the at least one transceiver from a network entity, at least one of: (1) a first indication of a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a second indication of a previous implementation of the first mapping, wherein the first mapping and the first list of indices do not include locations of the first set of network nodes; and select or configure at least one artificial intelligence (AI) or machine learning (ML) (AI/ML) positioning model based on at least one of the first indication or the second indication.

2. The apparatus of claim 1, wherein the at least one processor, individually or in any combination, is further configured to:

receive, from the network entity, a third indication of a second mapping that associates a second list of indices for second location information associated with a second set of network nodes and a second set of PRS resources, wherein the second set of network nodes is at least partially different from the first set of network nodes; and configure the at least one AI/ML positioning model based on the second mapping or selecting another AI/ML positioning model based on the second mapping.

3. The apparatus of claim 2, wherein the first location information includes a first set of locations and beams associated with the first set of network nodes, and wherein the second location information includes a second set of locations and beams associated with the second set of network nodes.

4. The apparatus of claim 2, wherein the at least one processor, individually or in any combination, is further configured to:

receive, from the network entity, an updated list of indices for the first location information, wherein the updated list of indices is at least partially different from the first list of indices.

5. The apparatus of claim 2, wherein the at least one processor, individually or in any combination, is further configured to:

transmit, to the network entity, a request to provide at least one of:

the first mapping, the first list of indices for the first location information, the second mapping, the second list of indices for the second location information, or an updated list of indices for the first location information.

6. The apparatus of claim 5, wherein the at least one processor, individually or in any combination, is further configured to:

receive, from the network entity, a configuration indicating at least one of a periodicity or a condition for the transmission of the request.

7. The apparatus of claim 2, wherein the at least one processor, individually or in any combination, is further configured to:

train the at least one AI/ML positioning model based on the first mapping or the second mapping.

8. The apparatus of claim 1, wherein the at least one AI/ML positioning model is at least one UE-side AI/ML positioning model.

9. The apparatus of claim 1, wherein the at least one processor, individually or in any combination, is further configured to:

receive, from the network entity in response to the second indication, a notification regarding an update or a change for the first mapping.

10. The apparatus of claim 9, wherein the at least one processor, individually or in any combination, is further configured to:

transmit, to the network entity, a request to provide the notification regarding the update or the change for the first mapping, wherein the reception of the notification is based on the request.

11. The apparatus of claim 10, wherein the at least one processor, individually or in any combination, is further configured to:

receive, from the network entity, a configuration indicating at least one of a periodicity or a condition for the transmission of the request.

12. The apparatus of claim 10, wherein the at least one processor, individually or in any combination, is further configured to:

configure the at least one AI/ML positioning model based on the notification, or selecting another AI/ML positioning model based on the notification.

13. The apparatus of claim 1, wherein the network entity is a location server or a location management function (LMF), and wherein the first set of nodes includes one or more transmission reception points (TRPs), one or more cells, one or more sites, or a combination thereof.

14. A method of wireless communication at a user equipment (UE), comprising:

receiving, from a network entity, at least one of: (1) a first indication of a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a second indication of a previous implementation of the first mapping, wherein the first mapping and the first list of indices do not include locations of the first set of network nodes; and selecting or configuring at least one artificial intelligence (AI) or machine learning (ML) (AI/ML) positioning model based on at least one of the first indication or the second indication.

15. The method of claim 14, further comprising:

receiving, from the network entity, a third indication of a second mapping that associates a second list of indices for second location information associated with a second set of network nodes and a second set of PRS resources, wherein the second set of network nodes is at least partially different from the first set of network nodes; and configuring the at least one AI/ML positioning model based on the second mapping or selecting another AI/ML positioning model based on the second mapping.

16. The method of claim 15, further comprising:

receiving, from the network entity, an updated list of indices for the first location information, wherein the updated list of indices is at least partially different from the first list of indices.

17. The method of claim 15, further comprising:

transmitting, to the network entity, a request to provide at least one of:

the first mapping, the first list of indices for the first location information, the second mapping, the second list of indices for the second location information, or an updated list of indices for the first location information.

18. The method of claim 17, further comprising:

receiving, from the network entity, a configuration indicating at least one of a periodicity or a condition for the transmission of the request.

19. The method of claim 15, further comprising:

training the at least one AI/ML positioning model based on the first mapping or the second mapping.

20. An apparatus for wireless communication at a network entity, comprising:

at least one transceiver;

at least one memory; and at least one processor coupled to the at least one memory and the at least one transceiver, the at least one processor, individually or in any combination, is configured to:

configure at least one of: (1) a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a previous implementation of the first mapping, wherein the first mapping and the first list of indices do not include locations of the first set of network nodes; and transmit, via the at least one transceiver, to a user equipment (UE), at least one of (1) a first indication of the first mapping and the first list of indices for the first location information, or (2) a second indication of the previous implementation of the first mapping.

21. The apparatus of claim 20, wherein the at least one processor, individually or in any combination, is further configured to:

transmit, to the UE, a third indication of a second mapping that associates a second list of indices for second location information associated with a second set of network nodes and a second set of PRS resources, wherein the second set of network nodes is at least partially different from the first set of network nodes.

22. The apparatus of claim 21, wherein the first location information includes a first set of locations and beams associated with the first set of network nodes, and wherein the second location information includes a second set of locations and beams associated with the second set of network nodes.

23. The apparatus of claim 21, wherein the at least one processor, individually or in any combination, is further configured to:

transmit, to the UE, an updated list of indices for the first location information, wherein the updated list of indices is at least partially different from the first list of indices.

24. The apparatus of claim 21, wherein the at least one processor, individually or in any combination, is further configured to:

receive, from the UE, a request to provide at least one of:

the first mapping, the first list of indices for the first location information, the second mapping, the second list of indices for the second location information, or an updated list of indices for the first location information.

25. The apparatus of claim 24, wherein the at least one processor, individually or in any combination, is further configured to:

transmit, to the UE, a configuration indicating at least one of a periodicity or a condition for a transmission of the request.

26. The apparatus of claim 20, wherein the at least one processor, individually or in any combination, is further configured to:

transmit, to the UE based on the second indication, a notification regarding an update or a change for the first mapping.

27. The apparatus of claim 26, wherein the at least one processor, individually or in any combination, is further configured to:

receive, from the UE, a request to provide the notification regarding the update or the change for the first mapping, wherein the transmission of the notification is based on the request.

28. The apparatus of claim 27, wherein the at least one processor, individually or in any combination, is further configured to:

transmit, to the UE, a configuration indicating at least one of a periodicity or a condition for a transmission of the request.

29. The apparatus of claim 20, wherein the network entity is a location server or a location management function (LMF), and wherein the first set of nodes includes one or more transmission reception points (TRPs), one or more cells, one or more sites, or a combination thereof.

30. A method of wireless communication at a network entity, comprising:

configuring at least one of: (1) a first mapping and a first list of indices for first location information, wherein the first location information is associated with a first set of network nodes and a first set of positioning reference signal (PRS) resources and wherein the first mapping associates each index in the first list of indices with at least one PRS resource in the first set of PRS resources, or (2) a previous implementation of the first mapping, wherein the first mapping and the first list of indices do not include locations of the first set of network nodes; and transmitting, to a user equipment (UE), at least one of (1) a first indication of the first mapping and the first list of indices for the first location information, or (2) a second indication of the previous implementation of the first mapping.

* * * * *